(12) United States Patent
Kawase et al.

(10) Patent No.: US 6,859,244 B2
(45) Date of Patent: Feb. 22, 2005

(54) LIQUID CRYSTAL DEVICE INCLUDING COLOR FILTER FORMED ON REFLECTING FILM HAVING OPENINGS AND ELECTRONIC DEVICE USING THE SAME

(75) Inventors: Tomomi Kawase, Shiojiri (JP); Tatsuya Ito, Matsumoto (JP); Hisashi Aruga, Fujimi-machi (JP); Satoru Katagami, Hara-mura (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 10/681,350

(22) Filed: Oct. 9, 2003

(65) Prior Publication Data

US 2004/0070712 A1 Apr. 15, 2004

Related U.S. Application Data

(62) Division of application No. 10/043,240, filed on Jan. 14, 2002, now Pat. No. 6,690,448.

(30) Foreign Application Priority Data

Jan. 22, 2001 (JP) ........................................ 2001-013116
Oct. 30, 2001 (JP) ........................................ 2001-332916

(51) Int. Cl.$^7$ ...................... G02F 1/1335; G02F 1/1343
(52) U.S. Cl. ...................... 349/106; 349/113; 349/144
(58) Field of Search ............................... 349/106, 113, 349/144

(56) References Cited

U.S. PATENT DOCUMENTS 5,907,377 A    5/1999  Nishida et al. ............. 349/106
6,373,547 B2   4/2002  Saito et al. .................. 349/155
2002/0154257 A1 * 10/2002 Iijima ........................... 349/67
2002/0191134 A1 * 12/2002 Funahata et al. ........... 349/113
2003/0086037 A1 *  5/2003 Sekiguchi .................... 349/113

FOREIGN PATENT DOCUMENTS

| JP | 08-086912 | 4/1996 |
| JP | 2000-089023 | 3/2000 |
| JP | 2000-098125 | 4/2000 |
| JP | 2000-267081 | 9/2000 |
| JP | 2000-298271 | 10/2000 |

* cited by examiner

Primary Examiner—Tarifur R. Chowdhury
(74) Attorney, Agent, or Firm—Oliff & Berridge, PLC

(57) ABSTRACT

The present invention provides a transflective liquid crystal device in which color display can be made uniform over the display surface in both the reflective display mode and the transmissive display mode. The liquid crystal device can include a pair of substrates which sandwich liquid crystal, a light reflecting film formed on the substrate, and a color filter formed on the light reflecting film. The color filter can include a partitioning member, which divides the surface of the substrate into a plurality of sections, and subpixels which are individually formed in the sections. The light reflecting film is provided with openings formed at regions corresponding to the thickest parts of the subpixels, openings formed at regions corresponding to central parts of the section, openings which extend in longitudinal direction of the rectangular sections, or openings formed in the shape corresponding to the thickness distribution of the subpixels.

13 Claims, 28 Drawing Sheets

LIQUID CRYSTAL DEVICE INCLUDING COLOR FILTER FORMED ON REFLECTING FILM HAVING OPENINGS AND ELECTRONIC DEVICE USING THE SAME

This is a Divisional Application of U.S. patent application Ser. No. 10/043,240 filed on Jan. 14, 2002, now U.S. Pat. No. 6,690,448, the contents of which are incorporated herein in its entirety.

BACKGROUND OF THE INVENTION

1. Field of Invention

The present invention relates to transflective liquid crystal devices by which a reflective display that uses light reflected after passing through a liquid crystal layer and a transmissive display that uses light transmitted through the liquid crystal layer can be manufactured, and in which a color filter can be disposed on a light path so that color display can be realized.

2. Description of Related Art

Recently, liquid crystal devices have come into widespread use in electronic devices, such as mobile phones, portable computers, etc. In such liquid crystal devices, reflective liquid crystal devices, in which a light reflecting film is provided on an inside or outside surface of a substrate disposed at the side opposite to the observer's side of a liquid crystal layer, are known in the art. In reflective liquid crystal devices, light incident from the observer's side is reflected at the light reflecting film, and is used as a light source for display.

In addition, transmissive liquid crystal devices, in which an illuminating device, that is, a so-called backlight, is disposed at the side opposite to the observer's side of a liquid crystal layer and is used as a light source for display, are also know in the art. In addition, transflective liquid crystal devices, in which openings are formed in a light reflecting film, and in which reflective display is realized using regions excluding the openings in the light reflecting film and transmissive display is realized using the light passing the openings in the light reflecting film, are also known in the art.

On the other hand, recently, color display is often realized in liquid crystal devices by disposing a color filter having R (red), G(green), and B(blue) or C(cyan), M(magenta), and Y(yellow) subpixels, in a display area of the liquid crystal devices.

SUMMARY OF THE INVENTION

According to a known technique of color transflective displays, in which openings are formed in a light reflecting film and a color filter is used, uniform color display over the display area cannot be realized. The inventors have performed various experiments to discover the reason for this, and found that color display cannot be made uniform if the relationship between the openings in the light reflecting film and the R, G, and B or C, M, and Y subpixels regarding position and shape are not adequately coordinated.

In view of the above-described finding, an object of the present invention is to provide a transflective liquid crystal device in which color display can be made uniform over the display surface in both the reflective display mode and the transmissive display mode.

In order to attain the above-described object, according to a first aspect of the present invention, a liquid crystal device can include a pair of substrates which sandwich liquid crystal, a light reflecting film formed on at least one of the substrates, and a color filter formed on the light reflecting film. The color filter can include a partitioning member, which divides the surface of the substrate into a plurality of sections, and subpixels, which are individually formed in the sections, and openings are formed in the light reflecting film at regions corresponding to thickest parts of the subpixels.

The partitioning member may be formed by, for example, applying an ink-repellent resin at a uniform thickness by a known deposition method, for example, spin coating, and forming a predetermined pattern by a known patterning method, for example, photolithography. In addition, the above-described subpixels are formed by, for example, an inkjet method, that is, by ejecting, in the form of drops, a subpixel material from nozzles of an inkjet head toward the sections devided by the partitioning member.

In the liquid crystal device according to the first aspect of the present invention, as shown in FIG. 5, openings 18 are formed in a light reflecting film 9 at regions corresponding to thickest parts of subpixels 16. Thus, in the reflective display mode, light that passes through the subpixels 16 to and from the light reflecting film 9 at parts excluding the thickest parts of the subpixels 16, as shown by the arrow X0, is used for color display. In addition, in the transmissive display mode, light that passes through the subpixels 16 at thickest parts thereof, as shown by the arrow X1, is used for color display.

Accordingly, light that is transmitted through the subpixels 16 once at the thickest parts thereof is used in the transmissive display mode, and light that is transmitted through the subpixels 16 twice at relatively thin parts thereof is used in the reflective display mode. Accordingly, the optical thickness in the reflective display mode and that in the transmissive display mode can be made close or approximately the same, so that color display can be made uniform between the reflective display mode and the transmissive display mode.

According to a second aspect of the present invention, a liquid crystal device can include a pair of substrates which sandwich liquid crystal, a light reflecting film formed on at least one of the substrates, and a color filter formed on the light reflecting film. The color filter can include a partitioning member, which divides the surface of the substrate into a plurality of sections, and subpixels, which are individually formed in the sections, and openings are formed in the light reflecting film at regions corresponding to central parts of the sections.

The partitioning member may be formed by, for example, applying an ink-repellent resin at a uniform thickness by a known deposition method, for example, spin coating, and forming a predetermined pattern by a known patterning method, for example, photolithography. In addition, the above-described subpixels are formed by, for example, the inkjet method, that is, by ejecting, in the form of drops, a subpixel material from nozzles of an inkjet head toward the sections.

As shown in FIG. 5(a) and FIG. 5(c), in the case in which the subpixels 16 are formed by the inkjet method, the subpixels 16 tend to swell upward at central regions of the sections divided by a partitioning member 14. Accordingly, when the openings 18 are formed in the light reflecting film 9 at regions corresponding to the central parts of the sections divided by the partitioning member 14, the optical thickness in the reflective display mode and that in the transmissive display mode can be made close or approximately the same. Thus, color display can be made uniform between the reflective display mode and the transmissive display mode.

According to a third aspect of the present invention, a liquid crystal device can include a pair of substrates which sandwich liquid crystal, a light reflecting film formed on at least one of the substrates, and a color filter formed on the light reflecting film. The color filter can include a partitioning member, which divides the surface of the substrate into a plurality of rectangular sections, and subpixels, which are individually formed in the rectangular section, and openings are formed in the light reflecting film in such a manner that the openings extend in the longitudinal direction of the rectangular sections.

The partitioning member may be formed by, for example, applying an ink-repellent resin at a uniform thickness by a known deposition method, for example, spin coating, and forming a predetermined pattern by a known patterning method, for example, photolithography. In addition, the above-described subpixels are formed by, for example, the inkjet method, that is, by ejecting, in the form of drops, a subpixel material from nozzles of an inkjet head toward the sections.

Generally, in order to realize color display, especially full-color display, a unit including R, G, and B subpixels functions as a pixel, and a full-color image is displayed by controlling the color illuminated in each pixel. The R, G, and B subpixels are often formed in a rectangular shape. In such a case, as shown in FIG. 5(b), the partitioning member 14 forms a plurality of rectangular sections, and the subpixels 16 are individually formed in the sections.

In the case in which the subpixels 16 are formed in the rectangular shape as seen from top, the openings 18 are preferably formed in a rectangular shape that extends in the longitudinal direction of the subpixels 16. Accordingly, in the transmissive display mode, sufficient amount of light that is uniform in the longitudinal direction of the subpixels 16 can be supplied to the subpixels 16, so that uniform color display can be realized.

According to a fourth aspect of the present invention, a liquid crystal device can include a pair of substrates which sandwich liquid crystal, a light reflecting film formed on at least one of the substrates,-and a color filter formed on the light reflecting film. The color filter can include a partitioning member, which divides the surface of the substrate into a plurality of sections, and subpixels, which are individually formed in the sections, and openings are formed in the light reflecting film in such a manner that the openings have a shape corresponding to the thickness distribution of the subpixels.

The partitioning member may be formed by, for example, applying an ink-repellent resin at a uniform thickness by a known deposition method, for example, spin coating, and forming a predetermined pattern by a known patterning method, for example, photolithography. In addition, the above-described subpixels are formed by, for example, the inkjet method, that is, by ejecting, in the form of drops, a subpixel material from nozzles of an inkjet head toward the sections.

In the case in which the subpixels are formed by supplying ink, that is, a subpixel material to the sections divided by the partitioning member, the thickness of the subpixels may not be uniform. For example, as shown in FIG. 5(a) and FIG. 5(c), the subpixels 16 may be formed in a convex shape, in other words, shaped like a dome. When the thickness of the subpixels 16 is not uniform, the openings 18 are preferably formed only at regions corresponding to the parts of the subpixels 16 where the thickness thereof is larger than a reference value T0. Accordingly, the color display can be made more uniform between the reflective display mode and the transmissive display mode.

In the case in which the openings are formed in the light reflecting film in the shape corresponding to the thickness distribution of the subpixels, the shape of the openings is effectively determined utilizing light interference fringes. More specifically, as shown in FIG. 8(a), natural light R0 is radiated on the subpixel 16, and light reflected form the light reflecting film 9 is photographed by a camera 30. Then, when the photographed image is displayed, interference fringes F, which are schematically shown in FIG. 8(b), are obtained in accordance with the thickness distribution of the subpixel 16. The interference fringes F can be assumed as contour lines of the subpixel 16. Accordingly, when the openings 18 are formed in the light reflecting film in the shape of one of the interference fringes F which are selected, the openings having a shape that accurately corresponds to the thickness distribution of the subpixels can be obtained.

In the liquid crystal device according to one of the above-described first to fourth aspects of the present invention, the openings preferably have a planner shape such that the corners thereof are cut off. For example, the corners of the openings may be formed as beveled corners M1 shown in FIG. 6(b), rounded corners M2 shown in FIG. 7(b).

The subpixels formed in the sections divided by the partitioning member tend to have a convex shape such that the central parts thereof are thick and the peripheral parts thereof are thin. In addition, the surfaces of the subpixels are curved in three-dimensional space along the diagonal lines of the sections. In such a case, when the corners of the openings in the light reflecting film are formed in an angular shape of, for example, 90°, uniformity of color may be degraded at the corners of the openings. In contrast, when the openings have a shape such that the corners thereof are cut off as described above, uniform color distribution can be obtained.

In addition, in the liquid crystal device according to one of the above-described first to fourth aspects of the present invention, the planner shape of opening may have a rectangular shape, an oval shape, or an elliptical shape. The elliptical shape is a shape in which the corners of a rectangle are rounded in a certain way, and the oval shape is a shape excluding the elliptical shape that can also be obtained by rounding the corners of a rectangle.

When the openings are formed in one of the above-described shapes, color display can be made more uniform compared with the case in which the openings are formed in a square shape.

In addition, in the liquid crystal device according to one of the above-described first to fourth aspects of the present invention, the area of a single opening is 5% to 30%, and preferably about 20% of the area of a single section. When the aperture ratio is in the above-described range, satisfactory visibility can be achieved in both the reflective display mode and the transmissive display mode. When the aperture ratio is larger than the above-described range, display can become unclear since a sufficient amount of reflected light cannot be obtained by an illuminating device. When the aperture ratio is smaller than the above-described range, the display can become unclear since sufficient illumination cannot be obtained.

According to another aspect of the present invention, a manufacturing method for a liquid crystal device, in which liquid crystal is sandwiched between a pair of substrates, at least one of which includes a color filter, can include forming a light reflecting film on one of the substrates, forming a partitioning member which divides the surface of the substrate into a plurality of sections, and forming subpixels in the sections divided by the partitioning member. The step of forming the subpixels can further include ejecting, in the form of drops, a material for forming the subpixels from nozzles toward the sections and the step of forming the light reflecting film includes the step of forming openings in the light reflecting film at regions corresponding to the sections.

In the manufacturing method for the liquid crystal device according to the present invention, each subpixel can be formed by the inkjet method. Thus, the relationships between the openings formed in the light reflecting film and the subpixels can be individually adjusted, so that the colors displayed by the subpixels can be individually and precisely adjusted. Accordingly, uniform color display over the display area can be realized.

In the manufacturing method for the liquid crystal device according to the present invention, the openings can be formed in the light reflecting film at regions corresponding to thickest parts of the subpixels in the step of forming the light reflecting film. Accordingly, light that is transmitted through the subpixels once at the thickest parts thereof is used in the transmissive display mode, and light that is transmitted through the subpixels twice at relatively thin parts thereof is used in the reflective display mode. Accordingly, the optical thickness in the reflective display mode and that in the transmissive display mode can be made closer or approximately the same, so that color display can be made uniform between the reflective display mode and the transmissive display mode.

In addition, in the manufacturing method for the liquid crystal device according to the present invention, the openings are preferably formed in the light reflecting film at regions corresponding to central parts of the sections in the step of forming the light reflecting film. As shown in FIG. 5(a) and FIG. 5(c), in the case in which the subpixels 16 are formed by the inkjet method, the subpixels 16 tend to swell upward at central regions of the sections divided by the partitioning member 14. Accordingly, when the openings 18 are formed in the light reflecting film 9 at regions corresponding to the central parts of the sections divided by the partitioning member 14, the optical thickness in the reflective display mode and that in the transmissive display mode can be made close or approximately the same. Thus, color display can be made uniform between the reflective display mode and the transmissive display mode.

In addition, in the manufacturing method for the liquid crystal device according to the present invention, the surface of the substrate may be divided into a plurality of rectangular sections in the step of forming the partitioning member. In such a case, the openings are preferably formed in the light reflecting film in such a manner that the openings extend in the longitudinal direction of the rectangular sections in the step of forming the light reflecting film. Accordingly, in the transmissive display mode, a sufficient amount of light that is uniform in the longitudinal direction of the subpixels can be supplied to the subpixels, so that uniform color display can be realized.

In addition, in the manufacturing method for the liquid crystal device according to the present invention, the openings are preferably formed in the light reflecting film in such a manner that the openings have a shape corresponding to the thickness distribution of the subpixels in the step of forming the light reflecting film. In color display, density of color is significantly effected by the thickness of the subpixels. Thus, uniformity of color density can be degraded when the openings are formed irrespective of the thickness distribution of the subpixels. In contrast, uniform color display can be obtained when the shape of the openings is determined based on thickness distribution of the subpixels.

In addition, in the manufacturing method for the liquid crystal device according to the present invention, the openings having a shape such that the corners thereof are cut off are preferably formed in the light reflecting film in the step of forming the light reflecting film. The subpixels formed in sections divided by the partitioning member tend to have a convex shape such that the central parts thereof are thick and the peripheral parts thereof are thin. In addition, the surfaces of the subpixels are curved in three-dimensional space along the diagonal lines of the sections. In such a case, when the corners of the openings are formed in an angular shape of, for example, 90°, uniformity of color may be degraded at the corners of the openings. In contrast, when the openings have a shape such that the corners thereof are cut off as described above, uniform color distribution can be obtained.

In addition, in the manufacturing method for the liquid crystal device according to the present invention, the planner shape of opening having a rectangular shape, an oval shape, or an elliptical shape are preferably formed in the light reflecting film in the step of forming the light reflecting film. The elliptical shape is a specific shape in which the corners of a rectangle are rounded in a certain way, and the oval shape is a shape excluding the elliptical shape that can also be obtained by rounding the corners of a rectangle. When the openings are formed in one of the above-described shapes, color display can be made more uniform compared with the case in which the openings are formed in a square shape.

In addition, in the manufacturing method for the liquid crystal device according to the present invention, the openings are preferably formed in the light reflecting film in such a manner that the area of a single opening is 5% to 30%, and preferably about 20% of the area of a single section in the step of forming the light reflecting film. When the aperture ratio is in the above-described range, satisfactory visibility can be ensured in both the reflective display mode and the transmissive display mode. When the aperture ratio is larger than the above-described range, display becomes unclear since a sufficient amount of reflected light cannot be obtained. When the aperture ratio is smaller than the above-described range, the display becomes unclear since sufficient illumination cannot be obtained by an illuminating device.

In the liquid crystal device according to the present invention, the subpixels may be formed in a convex shape such that the central parts thereof swell upward.

In the manufacturing method for the liquid crystal device according to the present invention, the subpixels may be formed in a convex shape such that the central parts thereof swell upward.

According to another aspect of the present invention, a liquid crystal device comprises a pair of substrates which sandwich liquid crystal; a light reflecting film formed on at least one of the substrates; and a color filter formed on the light reflecting film. The color filter can include a partitioning member, which divides the surface of the substrate into a plurality of sections, and subpixels, which are individually formed in the sections. The subpixels are formed in a concave shape such that the central parts thereof are hollow, and openings are formed in the light reflecting film at regions corresponding to thickest parts of the subpixels.

According to another aspect of the present invention, a liquid crystal device can include a pair of substrates which sandwich liquid crystal, a light reflecting film formed on at least one of the substrates, and a color filter formed on the light reflecting film. The color filter includes a partitioning member, which divides the surface of the substrate into a plurality of sections, and subpixels, which are individually formed in the sections. The subpixels are formed in a concave shape such that the central parts thereof are hollow, and openings are formed in the light reflecting film at regions corresponding to part of peripheral parts of the sections in such a manner that the peripheral parts of the sections are partly or entirely covered by the openings.

According to another aspect of the present invention, a liquid crystal device can include a pair of substrates which sandwich liquid crystal, a light reflecting film formed on at least one of the substrates, and a color filter formed on the light reflecting film. The color filter includes a partitioning member, which divides the surface of the substrate into a plurality of rectangular sections, and subpixels, which are individually formed in the rectangular sections. The subpixels are formed in a concave shape such that the central parts thereof are hollow, and, and openings are formed in the light reflecting film in such a manner that the openings extend in the longitudinal direction or the lateral direction of the rectangular sections at regions corresponding to peripheral parts of the rectangular sections.

According to another aspect of the present invention, a liquid crystal device can include a pair of substrates which sandwich liquid crystal, a light reflecting film formed on at least one of the substrates, and a color filter formed on the light reflecting film. The color filter includes a partitioning member, which divides the surface of the substrate into a plurality of sections, and subpixels, which are individually formed in the sections. The subpixels are formed in a concave shape such that the central parts thereof are hollow, and openings are formed in the light reflecting film in such a manner that the openings have a shape corresponding to the thickness distribution of the subpixels.

In the manufacturing method for the liquid crystal according to the present invention, the subpixels may be formed in a concave shape such that the central parts thereof are hollow in the step of forming the subpixels, and the openings may be formed in the light reflecting film at regions corresponding to thickest parts of the subpixels in the step of forming the light reflecting film.

In addition, in the manufacturing method for the liquid crystal device according to the present invention, the subpixels may be formed in a concave shape such that the central parts thereof are hollow in the step of forming the subpixels, and the openings may be formed in the light reflecting film at regions corresponding to peripheral parts of the sections in such a manner that the peripheral parts of the sections are partly or entirely covered by the opening in the step of forming the light reflecting film.

In addition, in the manufacturing method for the liquid crystal device according to the present invention, the subpixels may be formed in a concave shape such that the central parts thereof are hollow in the step of forming the subpixels, and the openings may be formed in the light reflecting film at regions corresponding to peripheral parts of the rectangular sections in such a manner that the openings extend in the longitudinal direction or the lateral direction of the rectangular sections in the step of forming the light reflecting film.

In addition, in the manufacturing method of the liquid crystal device according to the present invention, the subpixels may be formed in a concave shape such that the central parts thereof are hollow in the step of forming the subpixels, and the openings may be formed in the light reflecting film in such a manner that the openings have a shape corresponding to the thickness distribution of the subpixels in the step of forming the light reflecting film.

According to another aspect of the present invention, an electronic device comprises a liquid crystal device which is constructed as described above and a housing which contains the liquid crystal device.

BRIEF DESCRIPTION OF THE DRAWINGS

The present invention will be described with reference to the accompanying drawing, wherein like numbers reference like elements, and wherein.

DETAILED DESCRIPTION OF PREFERRED EMBODIMENTS

Figure 1:
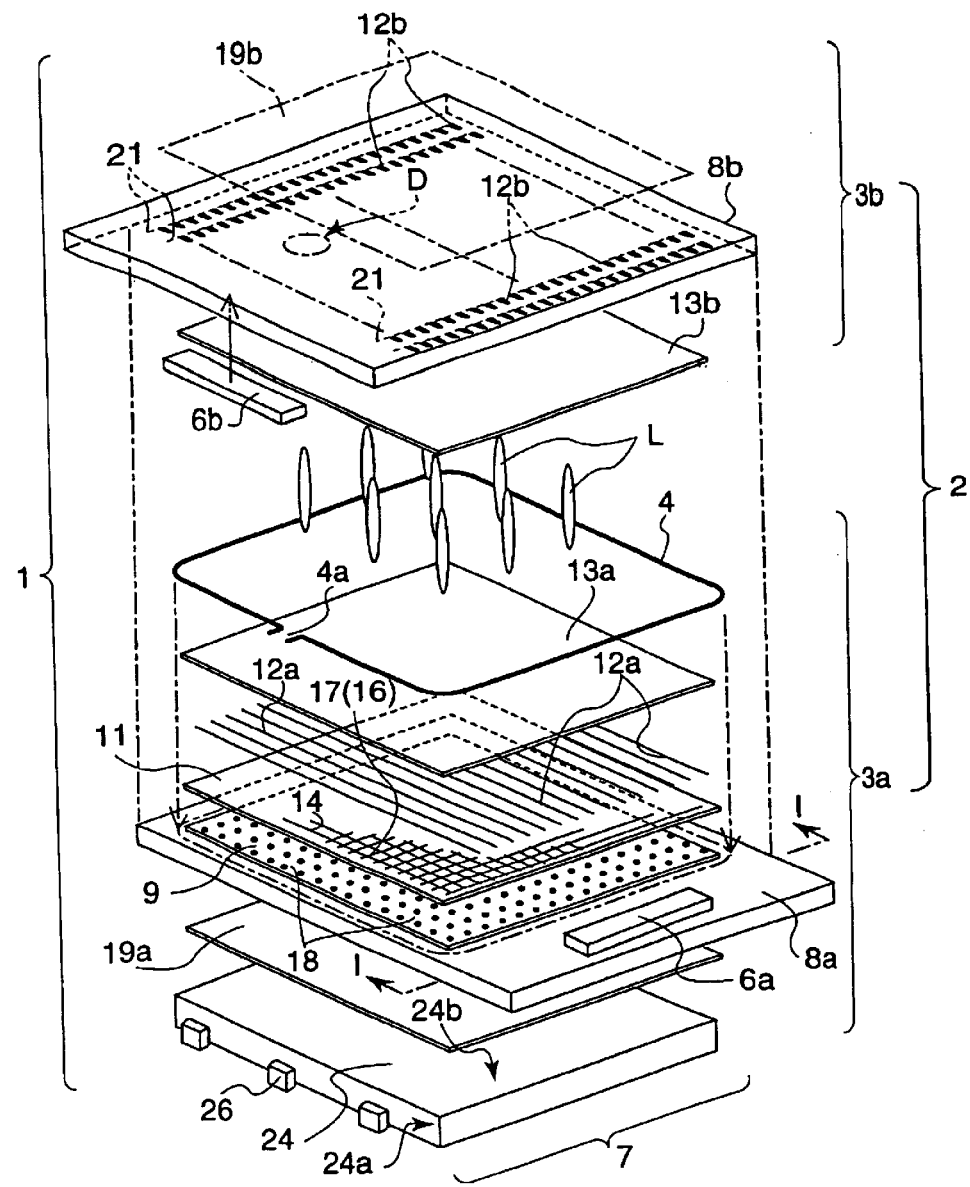
FIG. 1 is an exploded perspective view showing an embodiment of a liquid crystal device according to the present invention.
Figure 2:
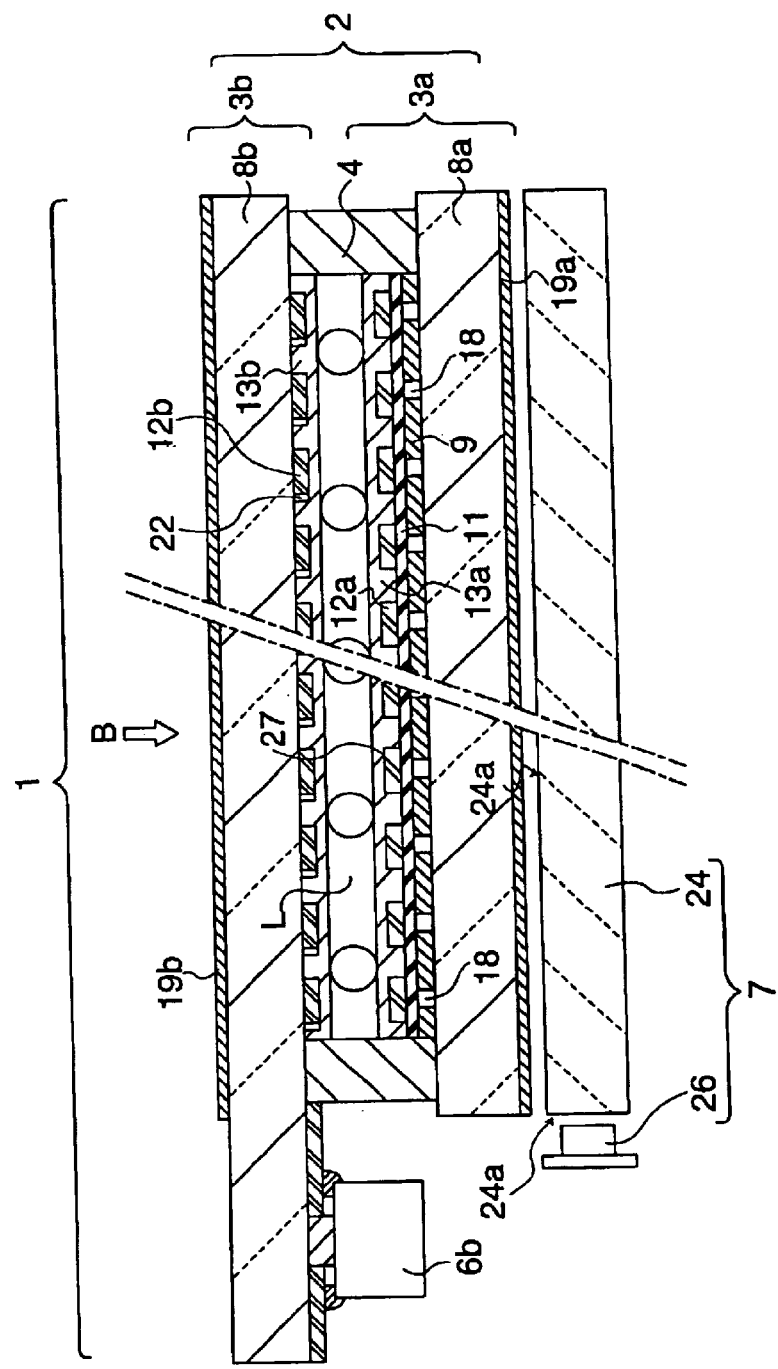
FIG. 2 is a sectional view of the liquid crystal device shown in FIG. 1 taken along line I—I.

The present invention will be explained below in conjunction with embodiments. FIG. 1 is an exploded view showing an embodiment of a liquid crystal device according to the present invention, and FIG. 2 is a sectional view of the liquid crystal device shown in FIG. 1 taken along line I—I. A liquid crystal device 1 of the present embodiment is an active matrix liquid crystal device using Thin Film Diodes (TFDs), which are two-terminal switching elements, as active elements. In addition, the liquid crystal device 1 is also a transflective liquid crystal device having both functions of reflective display and transmissive display, and a Chip On Glass (COG) type liquid crystal device in which an IC chip is directly mounted on a substrate.

With reference to FIG. 1, a liquid crystal panel 2 can be formed by laminating a first substrate 3a and a second substrate 3b with an annular sealing member 4. Then, liquid crystal L is injected into a gap, that is, a so-called cell gap, formed between the first and second substrates 3a and 3b. Then, liquid crystal driving ICs 6a and 6b are mounted on the first and second substrates 3a and 3b, respectively, and an illuminating device 7 is disposed at the side opposite to the observer's side, that is, outside the first substrate 3a in the present embodiment, as a backlight. The liquid crystal device 1 is thus constructed.

The liquid crystal driving ICs 6a and 6b are mounted using, for example, Anisotropic Conductive Films (ACFs). In addition, liquid crystal L is injected into the cell gap through an opening 4a formed in the sealing member 4 at a suitable position for passing the liquid crystal L therethrough. After the liquid crystal L is injected, the opening 4a is sealed by a resin, etc.

As shown in FIG. 2, the first substrate 3a can include a first base plate 8a formed of glass, plastic, etc., having a rectangular shape when viewed along the arrow B. In addition, a light reflecting film 9, a color filter 11, first electrodes 12a, and an alignment film 13a are formed on the inside surface of the first base plate 8a (the upper surface in FIG. 2), in that order. In addition, a polarizing plate 19a is laminated on the outside surface of the first base plate 8a.

As shown in FIG. 5(a), the color filter 11 can include a bank 14 which is formed on the light reflecting film 9 in a matrix pattern as seen form the arrow C and which serves as a partitioning member, a plurality of subpixels 16 which are individually disposed in the plurality of sections formed by the bank 14, and protecting films 17 which are individually formed on the subpixels 16. In the present embodiment, the subpixels 16 and the protecting films 17 are both formed by an inkjet method, which will be described below.

Figure 5:
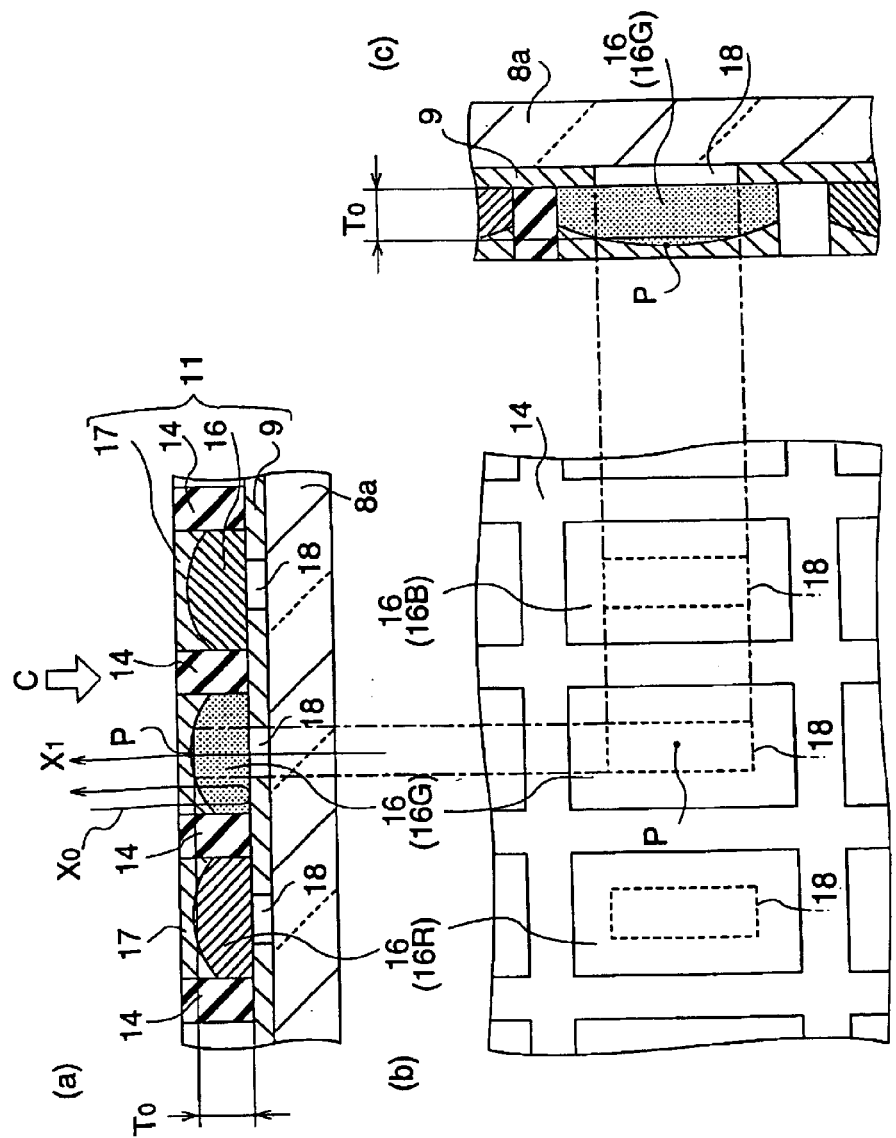
FIG. 5 is a schematic representation showing an example of a construction of a single pixel in a color filter, where (a) is a sectional view of subpixels taken along the lateral direction thereof, (b) is a plan view of the subpixels, and (c) is a sectional view of one of the subpixels taken along the longitudinal direction thereof.

Although FIG. 5 shows enlarged views of only some of the subpixels 16 (substantially three), the color filter 11 is constructed such that a large number of subpixels 16 are arranged in the longitudinal and lateral directions to form a matrix pattern when viewed along the arrow C. Each of the subpixels 16 functions as a dot for displaying an individual color, and a group consisting of three subpixels (a red subpixel 16R, a green subpixel 16G, and a blue subpixel 16B) form a single pixel.

As shown in FIG. 5(a) and FIG. 5(c), which are sectional views of the subpixels 16, each of the subpixels 16 is formed in a convex shape in which the highest part is at the center P, in other words, shaped like a dome. Conceivably, this shape is naturally formed when the subpixels 16 are formed by the inkjet method, that is, when a subpixel material is ejected toward the sections in the form of drops.

The subpixels 16 can be divided into red subpixels 16R, green subpixels 16G, and blue subpixels 16B, and are arranged in, for example, a striped pattern (FIG. 4(a)), a mosaic pattern (FIG. 4(b)), a deltoid pattern (FIG. 4(c)), etc. In the striped pattern, subpixels 16 of the same color are arranged in a line. In the mosaic pattern, three successive subpixels 16 correspond to R, G, and B both in the longitudinal and lateral directions. In the deltoid pattern, the subpixels 16 are arranged in a staggered manner such that three adjacent pixels correspond to R, G, and B.

With reference to FIG. 5(a), in the present embodiment, the bank 14 is formed by applying a nontransparent resin by a suitable coating method, for example, spin coating, and forming a pattern by a suitable patterning method, for example, photolithography. Since the bank 14 is formed of a nontransparent resin, the bank 14 also functions as a black mask which prevents light from leaking from the color filter 11. Of course, an additional black mask may also be disposed under the bank 14.

The protecting films 17 are normally formed of a transparent resin material, and can function, for example, as follows. Firstly, the surface of the color filter substrate can be flattened by forming the protecting films 17, so that electrodes can be prevented from being cut in the process of forming the electrodes on the surface of the color filter substrate. Secondly, the resistances of the electrodes formed on the protecting films 17 can be reduced, so that the contrast ratio between the pixels can be increased. Thirdly, the protecting films 17 can serve as protectors; more specifically, the protecting films 17 prevent the pixels formed in the color filter substrate from being damaged in processes performed after the protecting films 17 are formed. Fourthly, when the color filter substrate is installed in the liquid crystal device and liquid crystal is injected into the cell gap, the protecting films 17 prevent impurities from being diffused into the liquid crystal.

With reference to FIG. 1, the light reflecting film 9 can be formed by applying a light reflecting metal material such as Al, Ag, etc., and alloys thereof, at a uniform thickness by a suitable deposition method, for example, sputtering, and forming a pattern by a suitable patterning method, for example, photolithography. In the patterning process, openings 18 are formed in the light reflecting film 9 at regions for forming the subpixels, that is, positions corresponding to the individual sections formed by the bank 14.

As shown in FIGS. 5(a) to 5(c), in the present embodiment, the openings 18 are individually formed at central regions P of the sections formed by the bank 14, that is, regions corresponding to the thickest parts of the subpixels 16. In addition, as shown in FIG. 5(b), in the present embodiment, each of the openings 18 is formed in a rectangular shape that extends in the longitudinal direction of each subpixel 16.

With reference to FIG. 2, the first electrodes 12a are formed in a striped pattern when viewed along the arrow B. In FIGS. 1 and 2, a small number of first electrodes 12a with broad gaps therebetween are shown in order to facilitate the understanding of the pattern of the first electrodes 12a, however, in practice, a large number of first electrodes 12a are formed with extremely narrow gaps therebetween. The first electrodes 12a are formed by applying, for example, Indium Tin Oxide (ITO) at a uniform thickness by a suitable deposition method, for example, sputtering, and forming a predetermined pattern such as the striped pattern, etc., by a suitable patterning method, for example, photolithography.

In FIG. 1, the first electrodes 12a are formed so as to extend beyond the sealing member 4, so that the first electrodes 12a can be electrically connected to output bumps, that is, output terminals, of the Liquid crystal driving IC 6a. The Liquid crystal driving IC 6a supplies the first electrodes 12a with scanning signals or data signals.

The alignment film 13a is formed by, for example, applying a polyimide solution and baking it. The alignment film 13a is subjected to an alignment process, for example, a rubbing process, which determines the alignment of liquid crystal molecules in the liquid crystal L at the region close to the surface of the first substrate 3a.

In FIG. 1, the second substrate 3b includes a second base plate 8b formed of glass, plastic, etc., having a rectangular shape, and a plurality of second electrodes 12b are formed on the inside surface of the second base plate 8b (the lower surface in FIG. 1) in a matrix pattern. Although the second electrodes 12b are schematically shown in FIG. 1 at a large size in order to facilitate the understanding thereof, it should be understood that in practice, a large number of extremely small second electrodes 12b can be formed.

Figure 3:
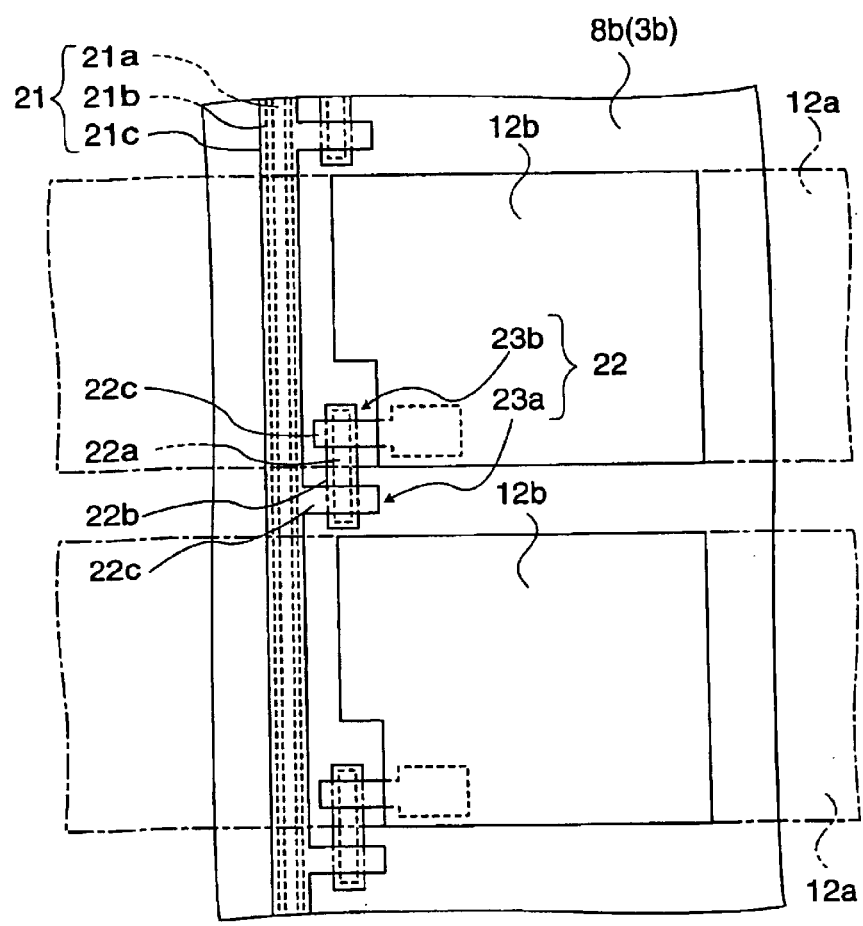
FIG. 3 is an enlarged view of a part shown by the arrow D in FIG. 1.

FIG. 3 is an enlarged view of a part of the second substrate 3b shown by the arrow D in FIG. 1. With reference to FIG. 3, an electrical line 21, TFD units 22 which extend from the electrical line 21 and which function as switching elements, and second electrodes 12b which are connected to the electrical line 21 via the TFD units 22 are formed on the inside surface of the second base plate 8b. As shown in FIG. 1, the second electrodes 12b are arranged in a dot-matrix pattern as described above.

Processes for forming the above-described components will be described below. First, a first layer 21a of the electrical line 21 and first metal films 22a of the TFD units 22 are formed by applying, for example, Tantalum (Ta) at a uniform thickness by sputtering and forming a pattern of the first layer 21a and the first metal films 22a. Then, a second layer 21b is formed on the first layer 21a of the electrical line 21 and insulating films 22b are formed on the first metal films 22a of the TFD units 22 by an anodizing process. Then, a third layer 21c is formed on the second layer 21b of the electrical line 21 and second metal films 22c are formed on the insulating films 22b of the TFD units 22 by applying, for example, chromium (Cr) at a uniform thickness by sputtering and forming a pattern of the third layer 21c and the second metal films 22c. There are two kinds of second metal films 22c: one kind of second metal film 22c extends from the electrical line 21 and overlaps the insulating films 22b and the other kind of second metal film 22c connects the insulating films 22b and the second electrodes 12b.

Accordingly, each of the TFD units 22 includes a first TFD element 23a at the side close to the electrical line 21 and a second TFD element 23b at the side close to the second electrodes 12b. The first TFD element 23a has a Metal-Insulator-Metal (MIM) structure in which the second metal film 22c, the insulating film 22b, and the first metal film 22a are laminated in that order from the electrical line 21. In addition, the second TFD element 23b has a Metal-Insulator-Metal (MIM) structure in which the first metal film 22c, the insulating film 22b, and the second metal film 22c are laminated in that order from the electrical line 21.

The above-described structure of the TFD units 22, in which two TFD elements are serially connected in an electrically reversed manner, is called a "back-to-back" structure, and is used to obtain stable switching characteristics. In the case in which the required stability of the switching characteristics is not very high, a TFD unit constructed of a single TFD element may also be used in place of the TFD element having the back-to-back structure.

The second electrodes 12b, which are individually connected to the second metal films 22c of the second TFD elements 23b, can be formed by applying, for example, ITO, at a uniform thickness by a suitable deposition method, for example, sputtering, and forming a pattern by a suitable patterning method, for example, photolithography. With reference to FIG. 1, the first electrodes 12a can be arranged on the first substrate 3a, which opposes the second substrate 3a, in a direction such that the first electrodes 12a cross the electrical line 21 shown in FIG. 3, for example, in the direction perpendicular to the electrical line 21.

With reference to FIG. 2, an alignment film 13b is formed on the second electrodes 12b. Although the second electrodes 12b having a relatively large size are schematically shown in FIG. 2 in order to facilitate the understanding thereof, in practice, a large number of extremely small second electrodes 12b are formed. The alignment film 13b is formed by, for example, applying a polyimide solution and baking it. The alignment film 13b is subjected to an alignment process, for example, a rubbing process, which determines the alignment of the liquid crystal molecules in the liquid crystal L at the region close to the surface of the second substrate 3b.

A polarizing plate 19b can be laminated on the outside surface of the second base plate 8b. The polarizing plate 19b is aligned such that the polarization axis thereof is at a predetermined angle relative to the polarization axis of the polarizing plate 19a formed on the first substrate 3a.

In FIG. 1, the electrical lines 21 are formed on the second substrate 3b so as to extend beyond the sealing member 4, so that the electrical lines 21 can be electrically connected to output bumps, that is, output terminals, of the Liquid crystal driving IC 6b. One of the scanning signals and data signals is supplied to the first electrodes 12a by the liquid crystal driving IC 6a, and the other one of the scanning signals and data signals is supplied to the TFD units 22 by the liquid crystal driving IC 6b via the electrical lines 21.

With reference to FIG. 1, the illuminating device 7, which is disposed at the rear side of the first substrate 3a, that is, the side opposite to the observer's side, includes a transparent plate 24 and a plurality of (for example, three) LEDs 26, which serve as light sources. The transparent plate 24 has approximately the same area as the first substrate 3a, and the LEDs 26 are disposed such that the LEDs 26 oppose a light entrance 24a, which is one of the side surfaces of the transparent plate 24. The transparent plate 24 is formed of acrylic resin, polycarbonate resin, glass, etc. Light incident from the light entrance 24a is transmitted through the light entrance 24a, is uniformly emitted via a light exit surface 24b, which faces the liquid crystal panel 2, and is supplied to the liquid crystal panel 2.

With reference to FIG. 2, the first substrate 3a and the second substrate 3b are laminated by the sealing member 4. The cell gap formed between the first and the second substrates 3a and 3b is maintained by spacers 27, which are sprayed over one of the first and second substrates 3a and 3b, and the liquid crystal L is injected into the cell gap. Twisted Nematic (TN) liquid crystal, for example, is used as the liquid crystal L.

The liquid crystal device 1 of the present embodiment is constructed as described above. When the liquid crystal device 1 serves as a reflective liquid crystal device, external light incident from the outside of the first substrate 3b of an observer in FIG. 2, such as sunlight, room light, etc., is transmitted through the liquid crystal L, reflected at the light reflecting film 9, and supplied to the liquid crystal L.

When the liquid crystal device I serves as a transmissive liquid crystal device, light is emitted from the LEDs 26, which are included in the illuminating device 7, is incident on the transparent plate 24 via the light entrance 24a, and is uniformly emitted via the light exit surface 24b. Then, the light emitted from the transparent plate 24 is transmitted through the openings 18 formed in the light reflecting film 9, and is supplied to the liquid crystal L.

In both cases, that is, in the reflective display and the transmissive display, voltages are applied between the first electrodes 12a which sandwich the liquid crystal L and the second electrodes 12b, which oppose each other, in accordance with switching operations of the TFD units 22. Thus, the alignment of the liquid crystal molecules is controlled.

Light supplied to the liquid crystal L is modulated in accordance with the above-described alignment control, and is divided into polarized light that passes through the polarizing plate 19b and polarized light that cannot pass through the polarizing plate 19b. Accordingly, an image is displayed at the observer's side. At this time, a desired color of R, G, or B can be displayed by allowing light to pass through the subpixel corresponding to that color.

In the present embodiment, as shown in FIGS. 5(a) to (c), the openings 18 are formed in the light reflecting film 9 at regions corresponding to the thickest parts of the subpixels 16. Thus, in the reflective display mode, light that passes through the subpixels 16 to and from the light reflecting film 9 at parts excluding the thickest parts of the subpixels 16, as shown by the arrow X0, is used for color display. In addition, in the transmissive display mode, light that passes through the subpixels 16 at the thickest parts thereof, as shown by the arrow X1, is used for color display.

Accordingly, light that is transmitted through the subpixels 16 once at the thickest parts thereof is used in the transmissive display mode, and light that is transmitted through the subpixels 16 twice at relatively thin parts thereof is used in the reflective display mode. Accordingly, the optical thickness in the reflective display mode and that in the transmissive display mode can be made close or approximately the same, so that color display can be made uniform between the reflective display mode and the transmissive display mode.

As shown in FIG. 5(a) and FIG. 5(c), in the case in which the subpixels 16 are formed by the inkjet method (which will be described in greater detail below), the subpixels 16 tend to swell upward at the central regions of the sections formed by the bank 14. Accordingly, when the openings 18 are formed in the light reflecting film 9 at regions corresponding to the central parts of the sections divided by the bank 14, the optical thickness in the reflective display mode and that in the transmissive display mode can be made close or approximately the same. Thus, uniform color can be made uniform between the reflective display mode and the transmissive display mode.

In addition, in the present embodiment, a plurality of rectangular sections are formed by the bank 14, as shown in FIGS. 5(a) to (c), and the subpixels 16 are individually formed in the rectangular sections. In addition, the openings 18 formed in the light reflecting film 9 have a rectangular shape that extends in the longitudinal direction of the rectangular sections. Accordingly, in the transmissive display mode, sufficient amount of light that is uniform in the longitudinal direction of the subpixels 16 can be supplied to the subpixels 16, so that uniform color display can be realized.

Figure 6:
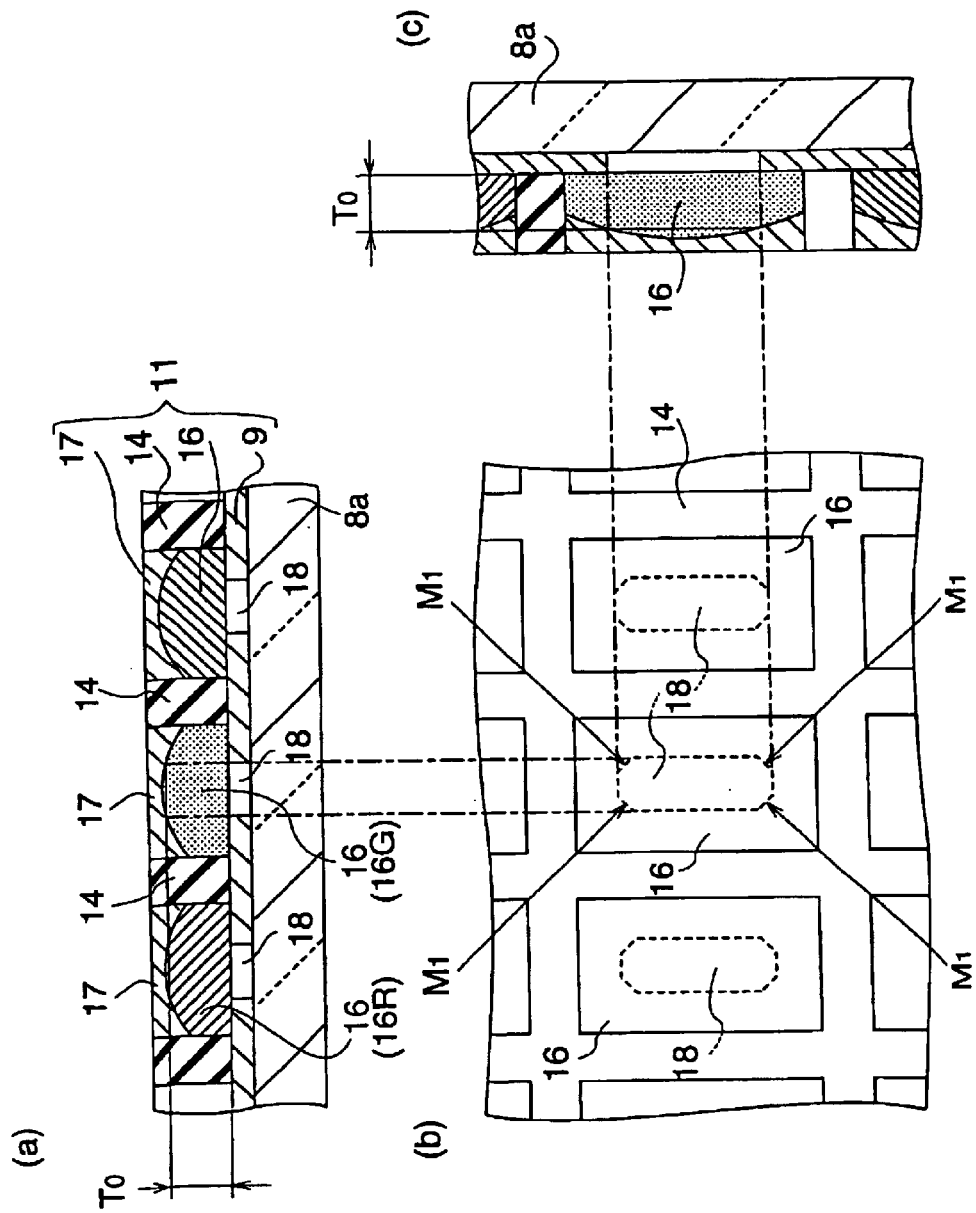
FIG. 6 is a schematic representation showing another example of a construction of a single pixel in a color filter, where (a) is a sectional view of subpixels taken along the lateral direction thereof, (b) is a plan view of the subpixels, and (c) is a sectional view of one of the subpixels taken along the longitudinal direction thereof.

FIG. 6 shows a modification of the openings 18 formed in the light reflecting film 9. The openings 18 shown in FIG. 6 are the same as the openings 18 shown in FIG. 5 according to the above-described embodiment except that four corners of the openings 18 are beveled. In order to form the openings 18 having beveled corners M1, a photomask that has a pattern including corners corresponding to the above-described beveled corners M1 is used in the process of forming a pattern on the light reflecting film 9 by a suitable patterning method, for example, photolithography.

Since the openings 18 having the beveled corners M1 are formed, light can be supplied in accordance with the thickness distribution of the subpixels 16, which is curved along the diagonal line of each section formed by the bank 14. Accordingly, uniform color display can be realized.

Figure 7:
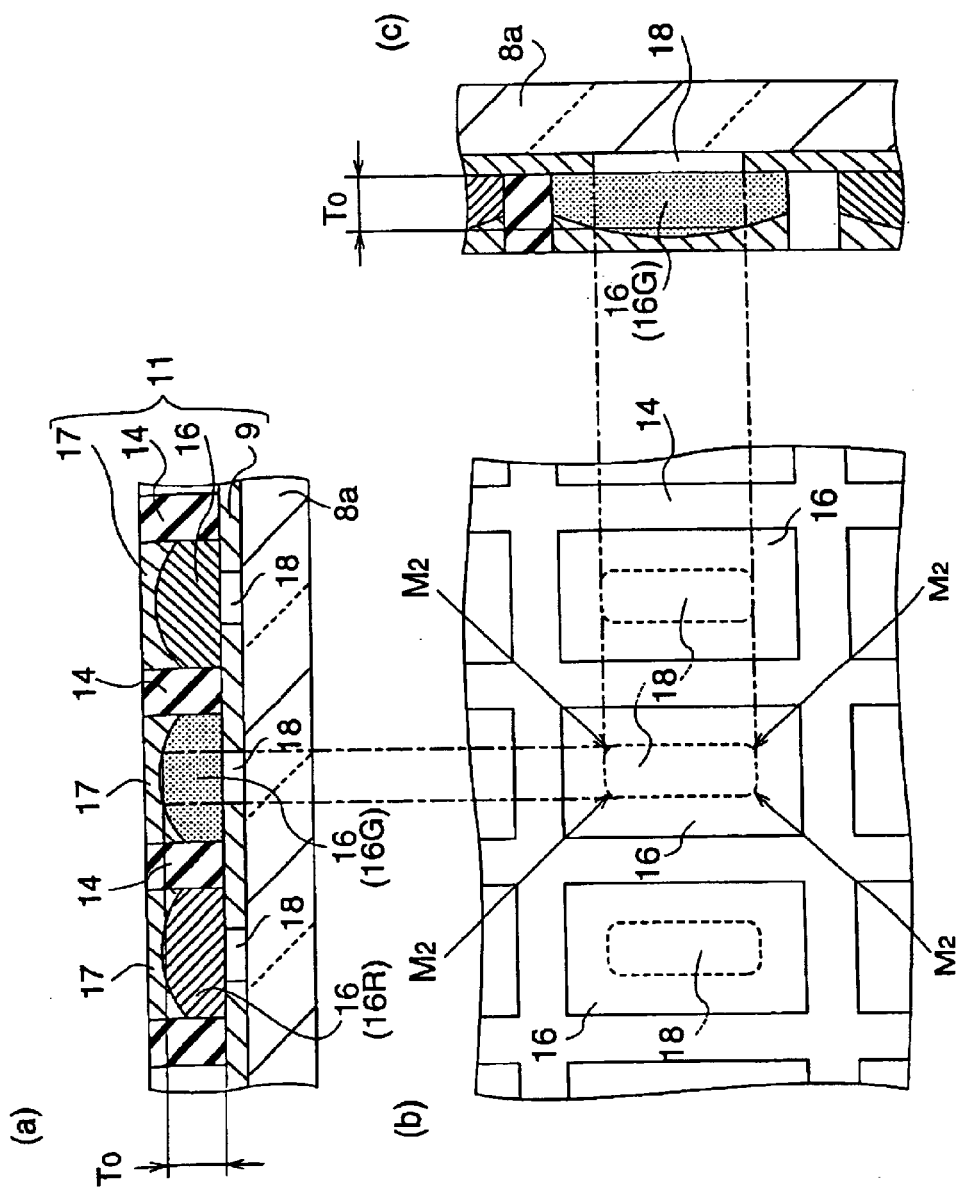
FIG. 7 is a schematic representation showing another example of a construction of a single pixel in a color filter, where (a) is a sectional view of subpixels taken along the lateral direction thereof, (b) is a plan view of the subpixels, and (c) is a sectional view of one of the subpixels cut along the longitudinal direction thereof.

FIG. 7 shows another modification of the openings 18 formed in the light reflecting film 9. The openings 18 shown in FIG. 7 are the same as the openings 18 shown in FIG. 5 according to the above-described embodiment except that the four corners of the openings 18 are rounded. Similarly to the modification shown in FIG. 6, in order to form the openings 18 having rounded corners M2, a photomask that has a pattern including corners corresponding to the above-described rounded corners M2 is used in the process of forming a pattern on the light reflecting film 9 by a suitable patterning method, for example, photolithography.

Similarly to the modification shown in FIG. 6, since the openings 18 having the rounded corners M2 are formed, light can be supplied in accordance with the thickness distribution of the subpixels 16, which is curved along the diagonal line of each section formed by the bank 14. Accordingly, uniform color display can be realized.

The planar shape of the openings 18, which are in the light reflecting film 9 such that the openings 18 individually correspond to the subpixels 16, may also have shapes other than the rectangular shape (FIG. 5(b)), the rectangular shape with beveled corners M1 (FIG. 6(b)), and the rectangular shape with rounded corners M2 (FIG. 7(b)). For example, the planar shape of the openings 18 may be an oval shape, which can be obtained by changing the dimension of the rounded corners M2 shown in FIG. 7(b), an elliptical shape, etc.

Figure 8:
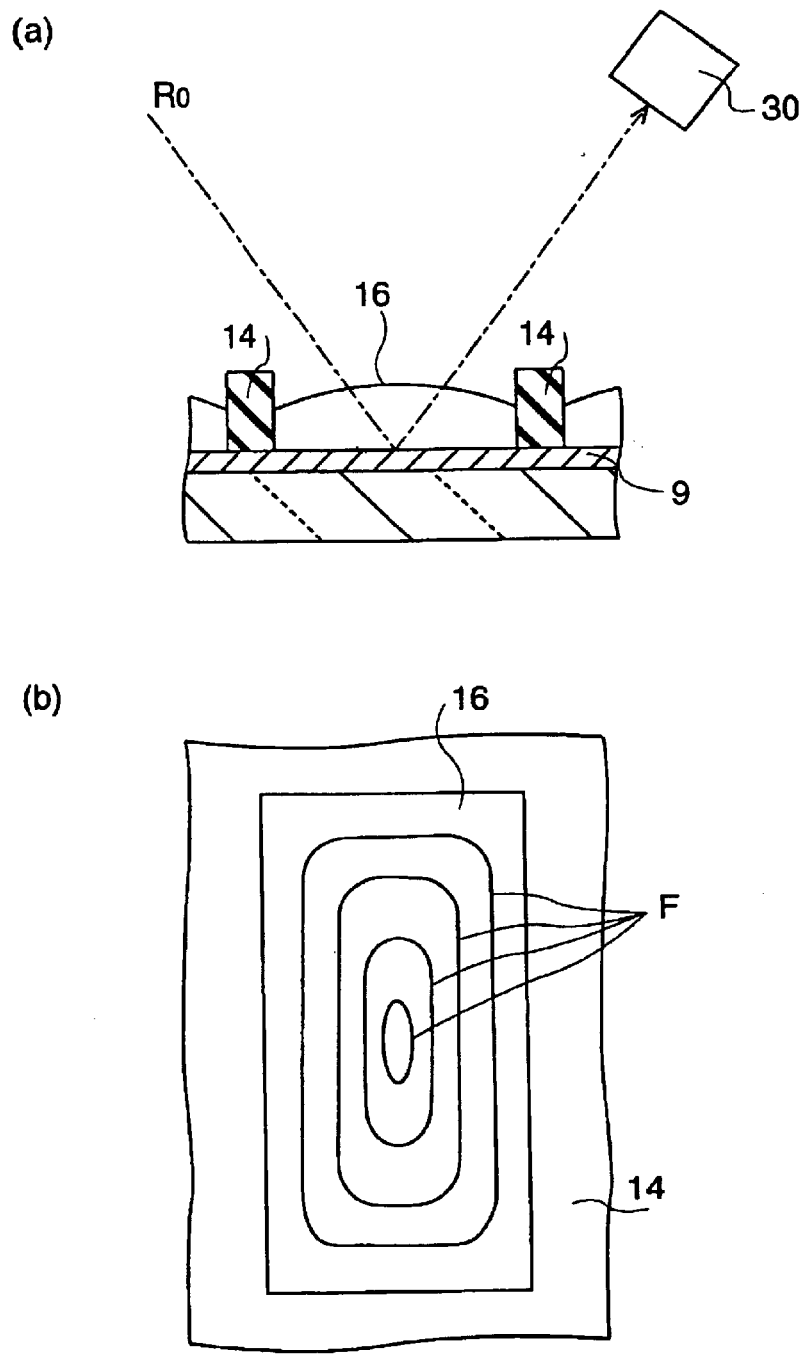
FIG. 8 is a schematic representation showing an example of a manner in which the color filter is formed, where (a) shows an example of a measurement system for obtaining interference fringes, and (b) is the interference fringes obtained by the measurement system.

FIG. 8 is a diagram showing another method for determining the shape of the openings 18 shown in FIG. 5. This method will be described below.

In the case in which the subpixels 16 are formed by supplying ink or a subpixel material to the sections formed by the bank 14 by the inkjet method, the thickness of the subpixels 16 may not be uniform. For example, as shown in FIG. 5(a) and FIG. 5(c), the subpixels 16 may be formed in a convex shape, in other words, shaped like a dome. When the thickness of the subpixels 16 is not uniform, the openings 18 are preferably formed in the light reflecting film at regions corresponding to the parts of the subpixels 16 where the thickness thereof is larger than a reference value T0. Accordingly, the color display can be made more uniform between the reflective display mode and the transmissive display mode.

In the case in which the openings 18 are formed in the light reflecting film 9 in the shape corresponding to the thickness distribution of the subpixels 16, the shape of the openings 18 is effectively determined utilizing light interference fringes. More specifically, as shown in FIG. 8(a), natural light R0 is radiated on the subpixel 16, and light reflected form the light reflecting film 9 is captured by a camera 30. Then, when the captured image is displayed, interference fringes F, which are schematically shown in FIG. 8(b), are obtained in accordance with the thickness distribution of the subpixel 16. The interference fringes F can be regarded as contour lines of the subpixel 16. Accordingly, when the openings are formed in the light reflecting film in the shape of one of the interference fringes F, the openings having a shape that accurately corresponds to the thickness distribution of the subpixels can be obtained.

The aperture ratio of the openings 18 is set in the range of 5% to 30%, and is preferably set to 20%. The aperture ratio is the ratio of the area of a single opening 18 to the area of a single section formed by the bank 14, that is, the area of a single subpixel 16.

When the aperture ratio is in the above-described range, satisfactory visibility can be ensured in both the reflective display mode and the transmissive display mode. When the aperture ratio is larger than the above-described range, display becomes unclear since a sufficient amount of reflected light cannot be obtained. When the aperture ratio is smaller than the above-described range, the display becomes unclear since sufficient illumination cannot be obtained by an illuminating device.

Figure 9:
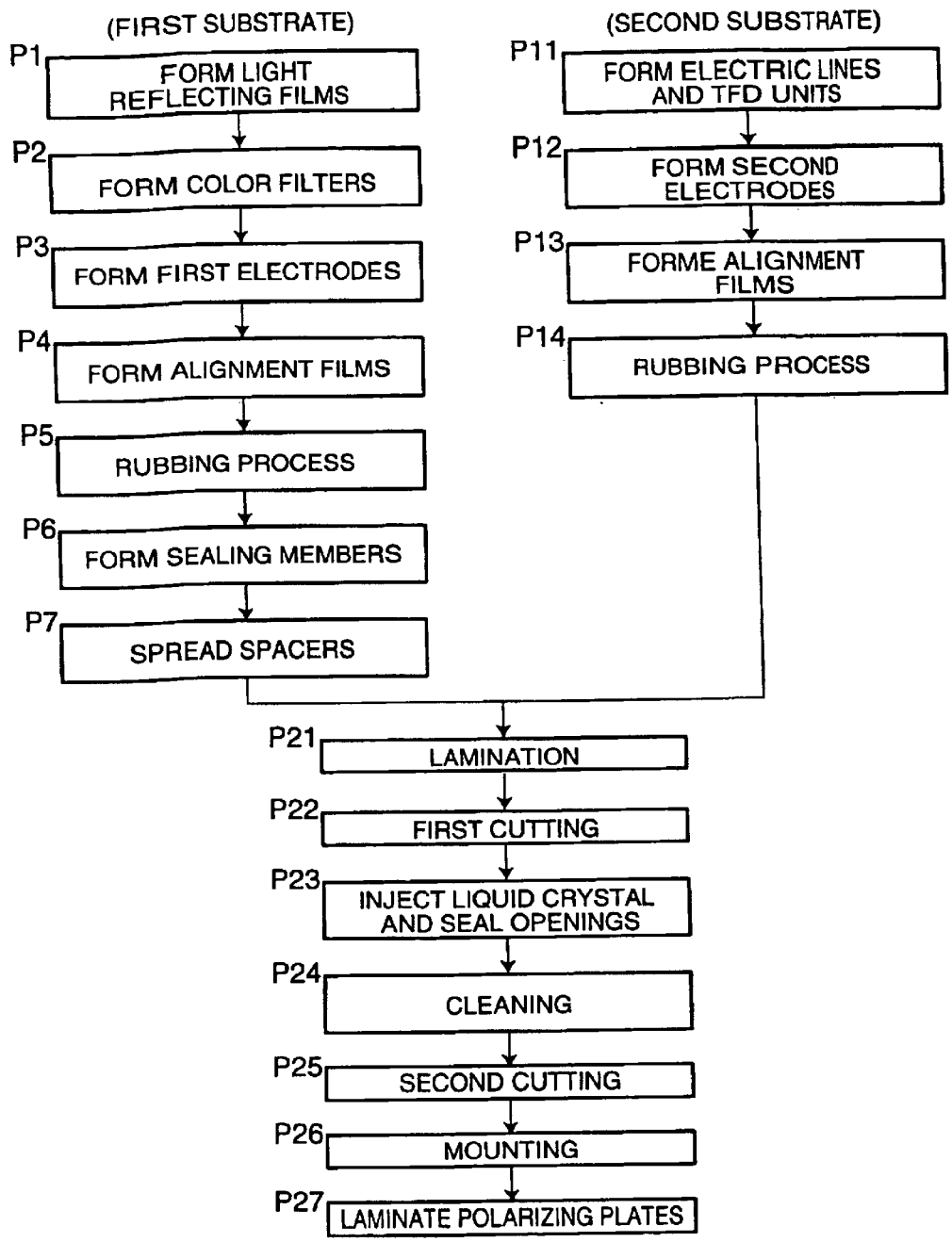
FIG. 9 is a flowchart showing an embodiment of a liquid crystal device manufacturing method according to the present invention.
Figure 10:
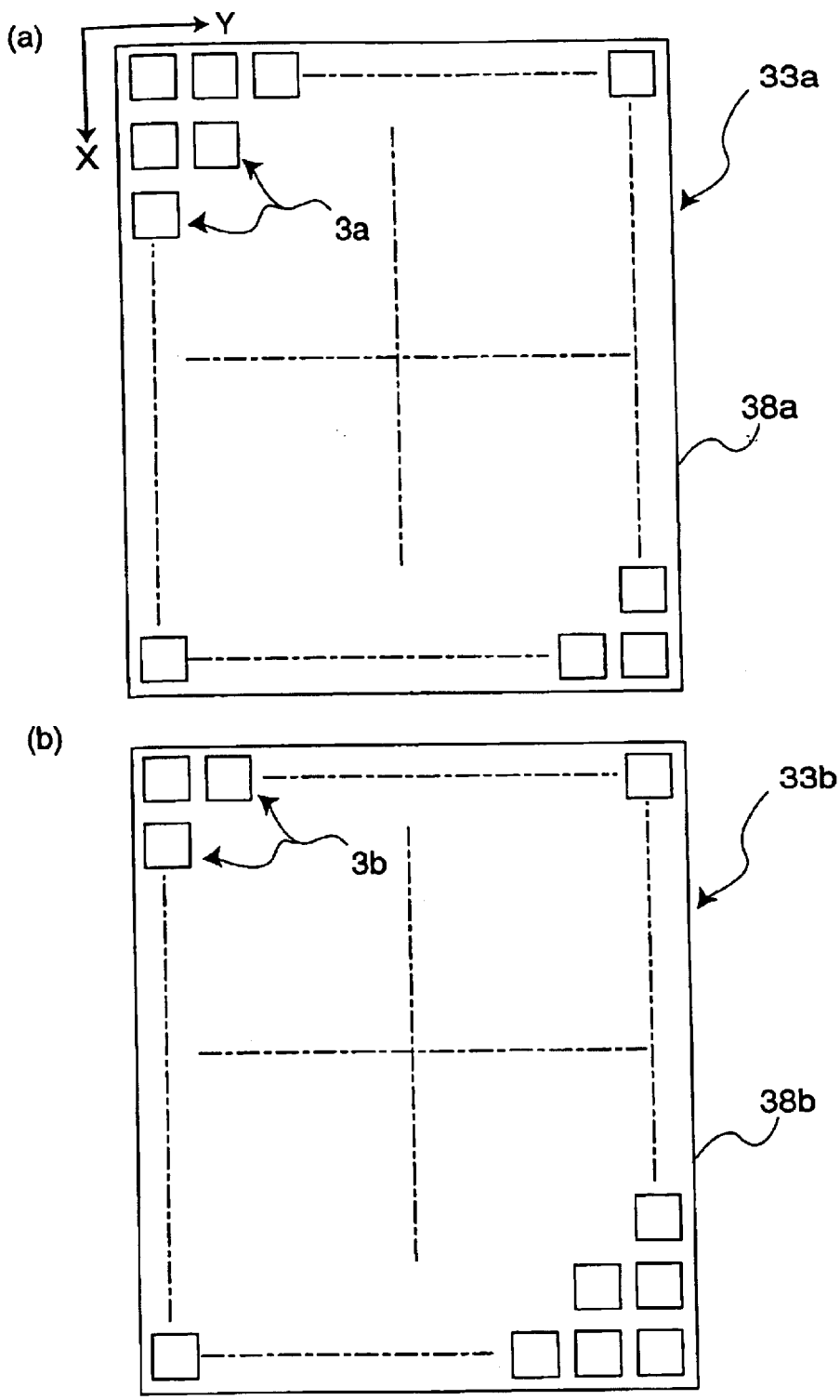
FIG. 10 is a schematic representation showing mother substrates formed in one of the processes shown in FIG. 9.

FIG. 9 shows an embodiment of a manufacturing method for the liquid crystal device shown in FIG. 1. In this manufacturing method, P1 to P7 are processes for forming the first substrate 3a, and P11 to P14 are processes for forming the second substrate 3b. Normally, the processes for forming the first substrate 3a and the processes for forming the second substrate 3b are individually performed. In the present embodiment, the first substrate 3a and the second substrate 3b having the size shown in FIG. 1 are not directly formed. As shown in FIGS. 10(a) and 10(b), first, a mother substrate 33a including a plurality of first substrates 3a and a mother substrate 33b including a plurality of second substrates 3b are constructed. Then, the first and the second substrates 3a and 3b are obtained by breaking the mother substrates 33a and 33b, respectively.

With reference to FIG. 9, the processes for forming the first substrate 3a will be described below. First, a first mother base plate 3 8a of large area (see FIG. 10(a)) formed of a transparent glass, a transparent plastic, etc., is prepared, and a plurality of light reflecting films 9 for a plurality of liquid crystal panels 2 are formed on the mother base plate 38a by photolithography, etc. (P1). Then, the color filters 11 are individually formed on the light reflecting films 9 by the inkjet method, which will be described below, etc. (P2), and then the first electrodes 12a are formed by photolithography, etc. (P3).

Then, the alignment films 13a are formed on the first electrodes 12a by painting, printing, etc. (P4), and then the alignment films 13a are subjected to an alignment process, for example, a rubbing process, which determines the initial alignment of the liquid crystal (P5). Next, the sealing members 4 are formed in a shape such that the sealing member 4 can individually surround regions corresponding to the liquid crystal panels 2 by screen printing, etc. (P6), and then spherical spacers 27 are spread over the alignment films 13a (P7). Accordingly, the mother substrate 33a of large area (see FIG. 10(a)) including a plurality of panel areas on first substrates 3a of the liquid crystal panels 2 is formed.

The processes for forming the second substrate 3b (P11 to P14 in FIG. 9) are performed separately from the above-described processes for forming the first substrate 3a. First, a second mother base plate 38b of large area (see FIG. 10(b)) formed of a transparent glass, a transparent plastic, etc., is prepared. Then, the electrical lines 21 and the switching elements 22 for a plurality of the liquid crystal panels 2 are formed on the surface of the second mother base plate 38b (P11), and then the second electrodes 12b are formed with ITO, etc., by photolithography, etc. (P12).

Next, the alignment films 13b (see FIG. 2) are formed by painting, printing, etc. (P13), and then the alignment films 13b are subjected to an alignment process, for example, a rubbing process, which determines the initial alignment of the liquid crystal (P14). Accordingly, the mother substrate 33b of large area including a plurality of panel areas on second substrates 3b of the liquid crystal panels 2 is formed.

After the first mother substrate 33a of large area and the second mother substrate 33b are formed as described above, the mother substrates 33a and 33b are aligned, that is, the positions and orientations thereof are adjusted. Then, the mother substrates 33a and 33b are laminated with the sealing member 4 therebetween (P21). Accordingly, a panel unit including a plurality of empty liquid crystal panels, that is, in which liquid crystal is not yet injected, is formed.

Next, the panel unit including the empty liquid crystal panels is cut into long rectangular panel pieces in such a manner that the opening 4a (see FIG. 1) formed in the sealing member 4 for injecting the liquid crystal is exposed in each of the liquid crystal panels (P22). Then, the liquid crystal L is injected into each of the liquid crystal panels through the opening 4a for injecting liquid crystal, and then the opening 4a is sealed by a resin, etc. (P23).

Generally, in the liquid crystal injection process, a container is filled with liquid crystal and the container filled with liquid crystal and the long rectangular panel pieces including the empty liquid crystal panels are first put into a chamber, etc. Then, the chamber, etc., is evacuated, and the panel pieces are dipped into the liquid crystal. Then, the chamber is vented to the atmosphere. Since the interior regions of the empty liquid crystal panels are a vacuum at this time, the liquid crystal, which is pressurized at atmospheric pressure, is drawn into the liquid crystal panels through the opening for injecting liquid crystal. Since the liquid crystal adheres to the exterior surfaces of the panel pieces in the liquid crystal injection process, the panel pieces are cleaned at P24 after the liquid crystal injection process.

Then, after the liquid crystal injection process and the cleaning process, the long rectangular panel pieces are subjected to a scribing process, that is, a cutting process, so that a plurality of liquid crystal panels 2 are obtained (P25). Then, as shown in FIG. 1, the Liquid crystal driving ICs 6a and 6b are mounted on each of the liquid crystal panels 2, and the illuminating device 7 is attached to each of the liquid crystal panels 2 as a backlight (P26). In addition, the polarizing plate 19a is formed on the outside surface of the first substrate 3a and the polarizing plate 19b is formed on the outside surface of the second substrate 3b (P27). The liquid crystal device 1 is thus completed.

In the processes for forming the first substrate 3a shown in FIG. 9, the color filter forming process (P2) will be described below in greater detail.

Figure 11:
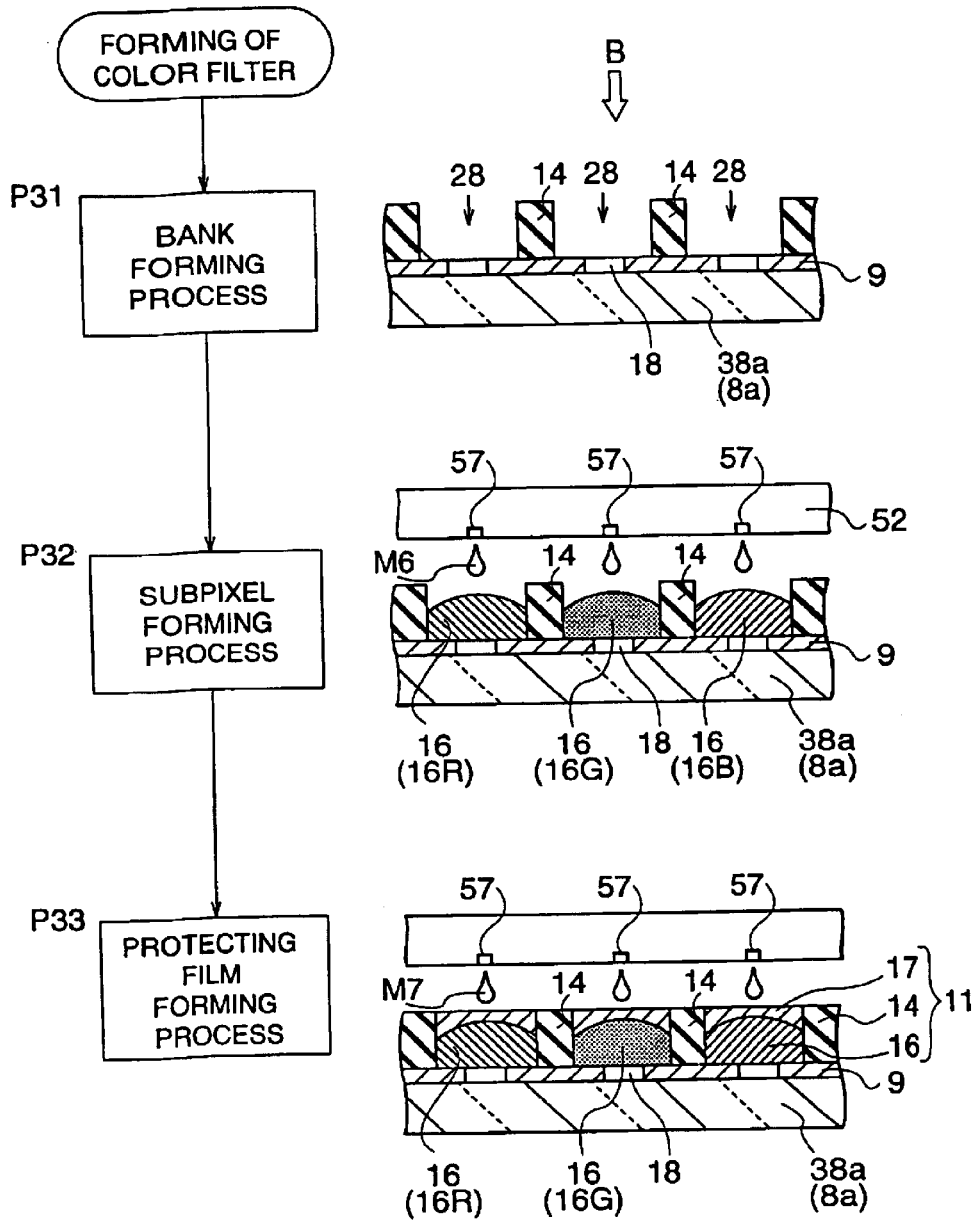
FIG. 11 is a flowchart showing a process of forming a color filter, which is one of the processes shown in FIG. 9.

FIG. 11 schematically shows processes for forming the color filter 11. First, as viewed along the arrow B, the bank 14 is formed of a nontransparent resin material in a matrix pattern on the surface of the mother base plate 38a formed of glass, plastic, etc., on which the light reflecting film 9 is formed (P31). The subpixels 16 are individually formed in cells 28 formed by the bank 14 in the matrix pattern.

The size of each cell 28 formed by the bank 14 is, for example, 30 μm×100 μm when viewed along the arrow B. The bank 14 is preferably formed by applying an ink-repellent resin at a uniform thickness by a suitable deposition method, for example, spin coating, and forming a predetermined matrix pattern by a suitable patterning method, for example, photolithography.

Then, at P32, red, green and blue subpixels 16 are formed in the sections formed by the bank 14 by the inkjet method. More specifically, an inkjet head 52 scans over the mother base plate 38a, and a subpixel material M6 is ejected from nozzles 57, which are formed in the inkjet head 52, in the form of ink drops at a timing corresponding to one of the patterns shown in FIG. 4 and adhered on the mother base plate 38a. Then, the subpixel material M6 is cured by baking it or by applying ultraviolet rays, thus completing the subpixels 16. The above-described processes are performed for each of the red, green, and blue subpixels 16R, 16G, and 16B, so that a desired subpixel pattern can be obtained.

Then, at P33, the protecting films 17 are individually formed on the subpixels 16 in the sections formed by the bank 14 by the inkjet method. More specifically, similarly to the processes for forming the subpixels 16, the inkjet head 52 scans over the mother base plate 38a, and a protecting film material M7 is ejected from the nozzles 57 which are formed in the inkjet head 52 toward the subpixel elements in the form of ink drops at a timing corresponding to one of the patterns shown in FIG. 4 and adhered on the subpixels 16 on the mother base plate 38a. Then, the protecting film material M7 is cured by, for example, baking it for 30 to 60 minutes at 200° C., thus completing the protecting films 17.

In the inkjet process for forming the subpixels 16 (P32), the inkjet head 52 may scan three times for individually forming the R, G, and B subpixels 16. Alternatively, the inkjet head 52 may be provided with three kinds of nozzles for the three colors (R, G, and B), so that the R, G, and B subpixels 16 can be formed by a single scan.

In addition, in the protecting film forming process (P33), ink drops of a predetermined volume may be provided to all the sections formed by the bank 14 by a single scan of the inkjet head 52. However, in the case in which the subpixels 16 formed in the section have different thicknesses in accordance with the colors thereof, the volume of the ink drops ejected from the nozzles 57 is adjusted in accordance with the colors of the subpixels 16.

The inkjet head 52 for the subpixel forming process (P32) and the inkjet head 52 for the protecting film forming process (P33) may be used in sequence in a single inkjet apparatus. Alternatively, the inkjet head 52 for the subpixel forming process (P32) and the inkjet head 52 for the protecting film forming process (P33) may be installed in different inkjet apparatuses, which are operated separately. In addition, a single inkjet head and a single inkjet apparatus may be used in both the subpixel forming process (P32) and the protecting layer forming process (P33) by changing the ink supplied to the inkjet head 52 between the subpixel material and the protecting film material.

In addition, the method for scanning the inkjet head 52 over the mother base plate 38a in the subpixel forming process (P32) and the protecting film forming process (P33) is not limited, and various methods can be considered. For example, the nozzles 57 may be arranged in a line having the same length as one side of the mother base plate 38a, and the subpixel material M6 and the protecting film material M7 may be supplied over the entire area of the mother base plate 38a by a single scan. Alternatively, the nozzles 57 may be arranged in a line that is shorter than one side of the mother base plate 38a, and the inkjet head 52 may be repeatedly moved in a main scanning direction and also in a sub-scanning direction for displacing a main sanning positions until ink is supplied over the entire area of the mother base plate 38a.

Figure 12:
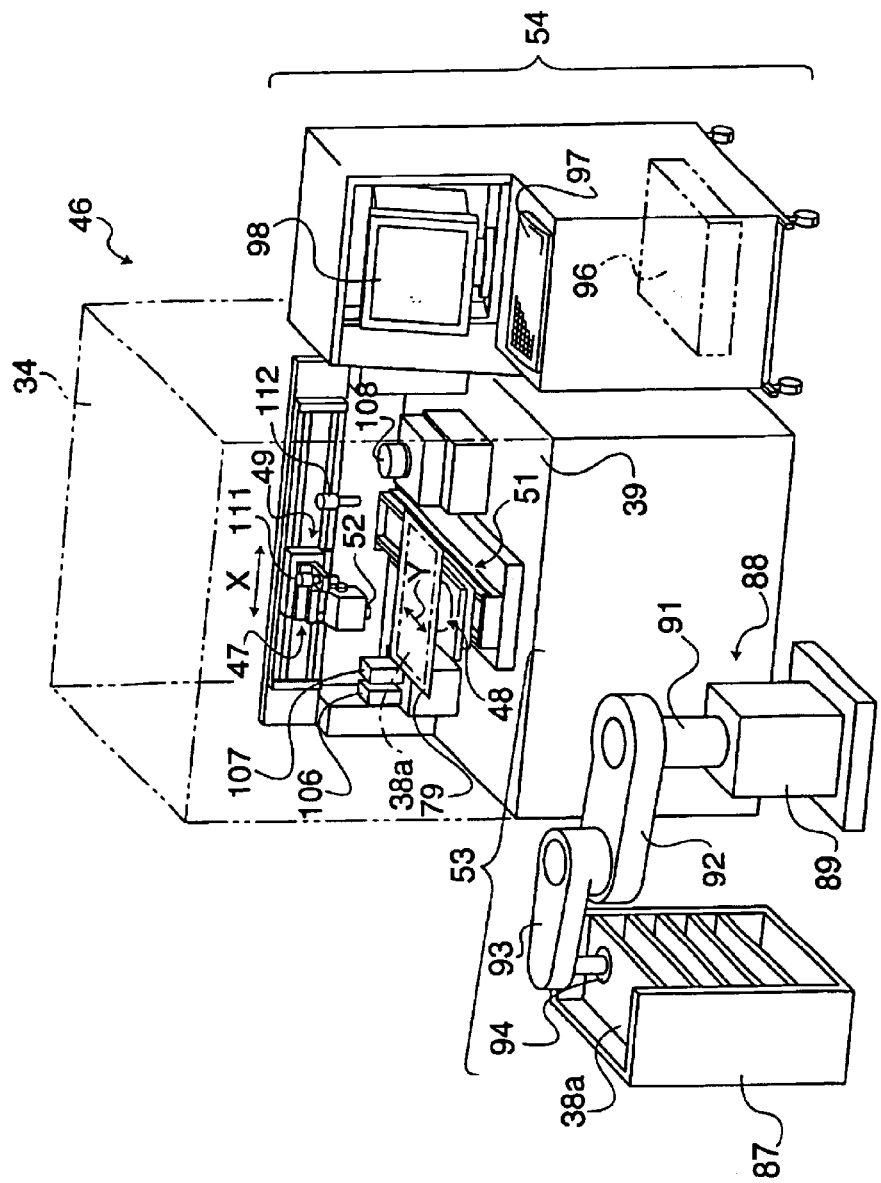
FIG. 12 is a perspective view showing an inkjet device used in one of the processes shown in FIG. 11.

FIG. 12 shows an example of an inkjet apparatus used in the subpixel forming process (P32) and the protecting film forming process (P33). An inkjet apparatus 46 is used for ejecting the subpixel material or the protecting film material onto the mother base plate 38a (see FIG. 10(a)) at predetermined positions in the substrate section 3a.

With reference to FIG. 12, the inkjet apparatus 46 can include a head unit 56 having the inkjet head 52, a head position controller 47 which controls the position of the inkjet head 52, a base plate position controller 48 which controls the position of the mother base plate 38a, a main scanning driver 49 which moves the inkjet head 52 relative to the mother base plate 38a in a main scanning direction, a sub-scanning driver 51 which moves the inkjet head 52 relative to the mother base plate 38a in a sub-scanning direction, a base plate supplying device 53 which transfers the mother base plate 38a to a predetermined position in the inkjet apparatus 46, and a control device 54 which controls the entire system of the inkjet apparatus 46.

The head position controller 47, the base plate position controller 48, the main scanning driver 49, and the sub-scanning driver 51 are disposed on a base 39. In addition, a cover 34 may be disposed over the above-described devices as necessary.

Figure 14:
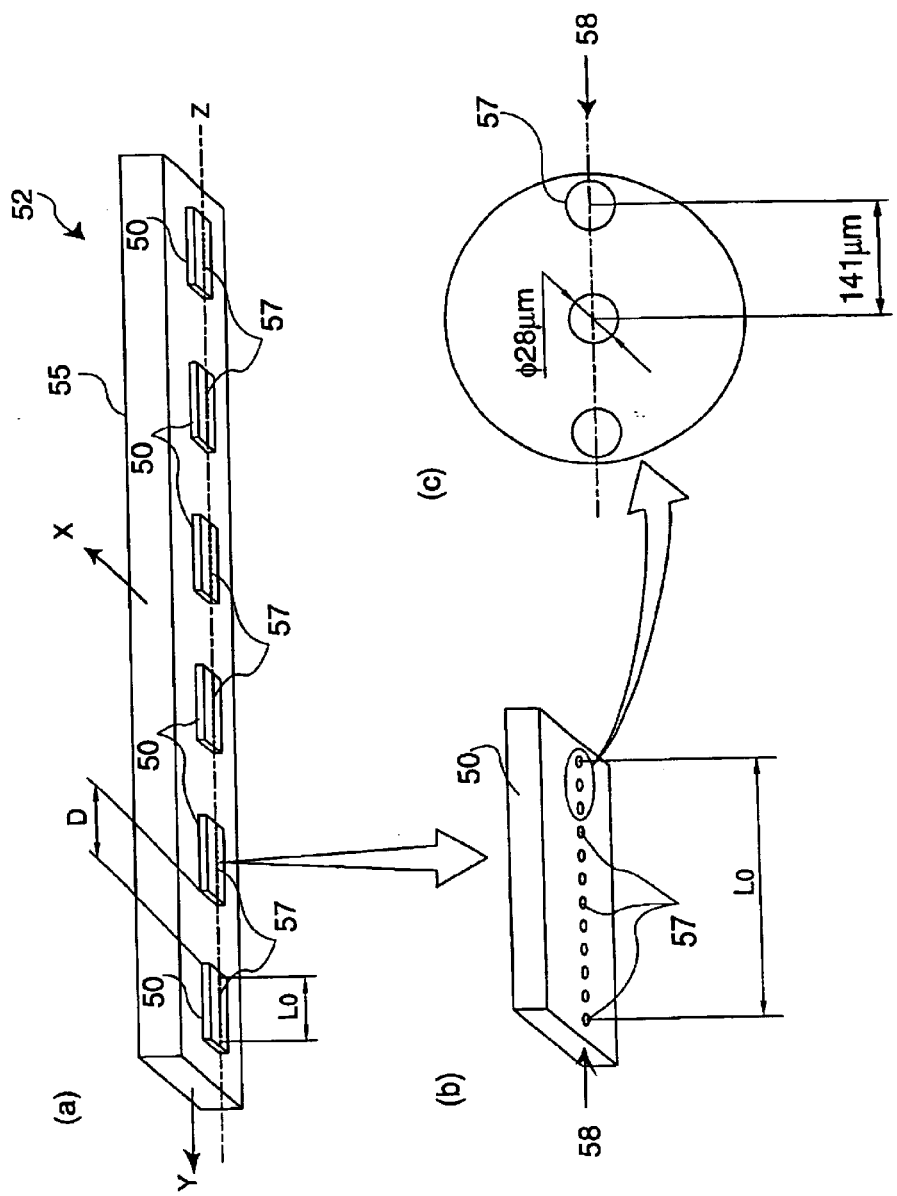
FIG. 14 is a schematic representation showing an example of an inkjet head used in the inkjet device shown in FIG. 12 and head chips included in the inkjet head.

As shown in FIG. 14, the inkjet head 52 includes a plurality of head chips 50 (in the present embodiment, six), and a carriage 55 which retains the head chips 50 such that the head chips 50 are arranged in a line. The carriage 55 is provided with holes, that is, concavities, which are slightly larger than the head chips 50, at positions at which the head chips 50 are to be retained. The head chips 50 are individually disposed in the concavities, and are fixed by screws, adhesives, or other fixing techniques. In the case in which the positions of the head chips 50 relative to the carriage 55 are precisely determined, the head chips 50 may also be fixed in the concavities by press fitting.

As shown in FIG. 14(b), each of the head chips 50 includes a nozzle line 58 in which a plurality of nozzles 57 are arranged in a line. The number of the nozzles 57 is, for example, 180, and the diameter of the nozzles 57 is, for example, 28 μm. In addition, the nozzle pitch between the nozzles 57 is, for example, 141 μm. In FIG. 14(a), X denotes the main scanning direction and Y denotes the sub-scanning direction of the inkjet head 52.

While the inkjet head 52 is moved over the mother base plate 38a in parallel to the X direction, the subpixel material or the protecting film material is ejected selectively from the nozzles 57 formed in the head chips 50. Thus, the subpixel material or the protecting film material adheres to the mother base plate 38a at predetermined positions. The position at which the inkjet head 52 is moved in the main scanning direction X can be shifted by moving the inkjet head 52 a predetermined distance, for example, an integral multiple of the length L0 of the nozzle lines 58, in the sub-scanning direction Y.

The nozzle lines 58 are formed in the head chips 50 in such a manner that the nozzle lines 58 are all arranged on a line Z when the head chips 50 are attached to the carriage 55. A distance D between adjacent head chips 50 is determined such that the distance between two nozzles 57, which individually belong to adjacent head chips 50 and which are individually disposed at ends close to each other, is the same as the length L0 of the nozzle lines 58 in the head 50. The nozzle lines 58 are arranged in the above-described manner merely for facilitating the movement control of the inkjet head 52 in the main scanning direction X and in the sub-scanning direction Y. Thus, the arrangement of the nozzle lines 58, that is, the arrangement of the head chips 50 relative to the carriage 55, may also be set in various ways other than the above-described arrangement.

Figure 16:
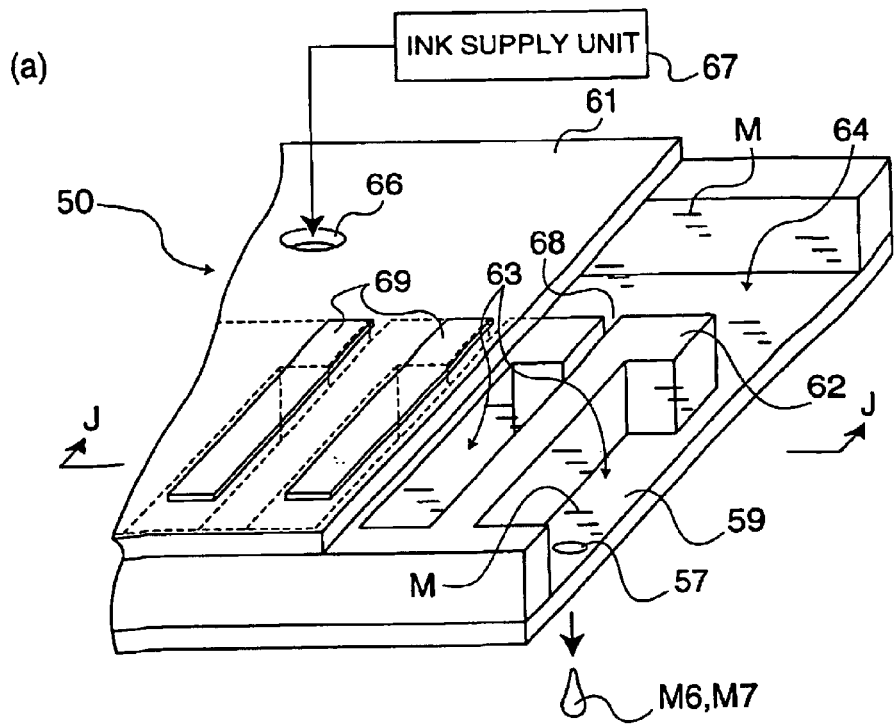
FIG. 16 is a schematic representation showing an internal structure of the head chip included in the inkjet head, where (a) is a partially broken perspective view of the head chip and (b) is a sectional view of (a) taken along line J—J.
Figure 16:
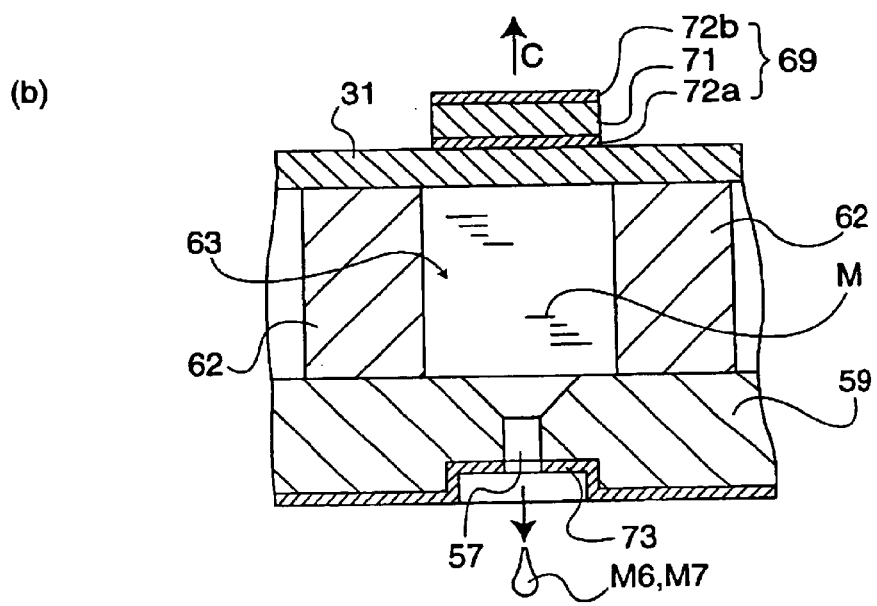

FIG. 16(a) and FIG. 16(b) show the internal structure of each of the head chips 50. More specifically, the head chip 50 includes a nozzle plate 59 formed of stainless steel, a vibrating plate 61 which opposes the nozzle plate 59, and a plurality of partitioning plates 62 which are fixed between the nozzle plate 59 and the vibrating plate 61. A plurality of ink cells 63 and an ink pool 64 are formed between the nozzle plate 59 and the vibrating plate 61 by the partitioning plates 62. The ink cells 63 are connected to the ink pool 64 by ink passages 68.

The vibrating plate 61 is provided with an ink supplying hole 66 at a suitable position, and an ink supplying device 67 is connected to the ink supplying hole 66. The ink supplying device 67 supplies the subpixel material M or the protecting film material M through -the ink supplying hole 66, so that the ink pool 64 and the ink cells 63 are filled with the subpixel material M or the protecting film material M. With respect to the subpixel material M, one of the materials corresponding to R, G, and B is supplied from the ink supplying device 67, and different head chips 50 are prepared for different colors.

The materials for forming the R, G, and B subpixels are formed by diffusing R, G, and B coloring materials in a solvent. In addition, the protecting film material M is formed of a transparent heat-curable resin or a transparent photo-curable resin and includes, for example, at least one of acrylic resin, epoxy resin, imide resin, and fluorocarbon resin. The viscosity of the protecting film material M is preferably set to 4 to 50 cps. When the viscosity is lower than 4 cps, the fluidity of the protecting film material M is too high so that it is difficult to form a predetermined shape, and when the viscosity is higher than 50 cps, it is difficult to eject a predetermined amount of material through the nozzles 57.

The nozzle plate 59 is provided with the nozzles 57 for ejecting the subpixel material M or the protecting film material M from the ink cells 63. In addition, ink pressurizing members 69 are disposed on the vibrating plate 61 at the side opposite to the side at which the ink cells 63 are formed, at positions corresponding to the ink cells 63. As shown in FIG. 16(b), each of the ink pressurizing members 69 includes a piezoelectric element 71 and a pair of electrodes 72a and 72b which sandwich the piezoelectric element 71. When a voltage is applied across the electrodes 72a and 72b, the piezoelectric element 71 deforms to swell outward in the direction shown by the arrow C, so that the capacity of the ink cell 63 increases. Thus, the subpixel material M or the protecting film material M flows into the ink cell 63 from the ink pool 64 through the ink passage 68 by the amount corresponding to the increased capacity of the ink cells 63.

Then, when the voltage applied across the electrodes 72a and 72b is removed, the piezoelectric element 71 and the vibrating plate 61 return to their initial shapes, and the capacity of the ink cells 63 is reduced to the initial value. Thus, the subpixel material M or the protecting film material M contained in the ink cells 63 is pressurized, and is ejected toward the mother base plate 38a (see FIG. 10(a)) via the nozzle 57 as an ink drop M6 or M7. In order to prevent the ink drop M6 or M7 from being stuck in the nozzle 57 or being ejected in an undesirable direction, an ink-repellent layer 73 formed of, for example, a Ni-tetrafluoroethylene deposited layer, is formed around the nozzle 57.

Figure 13:
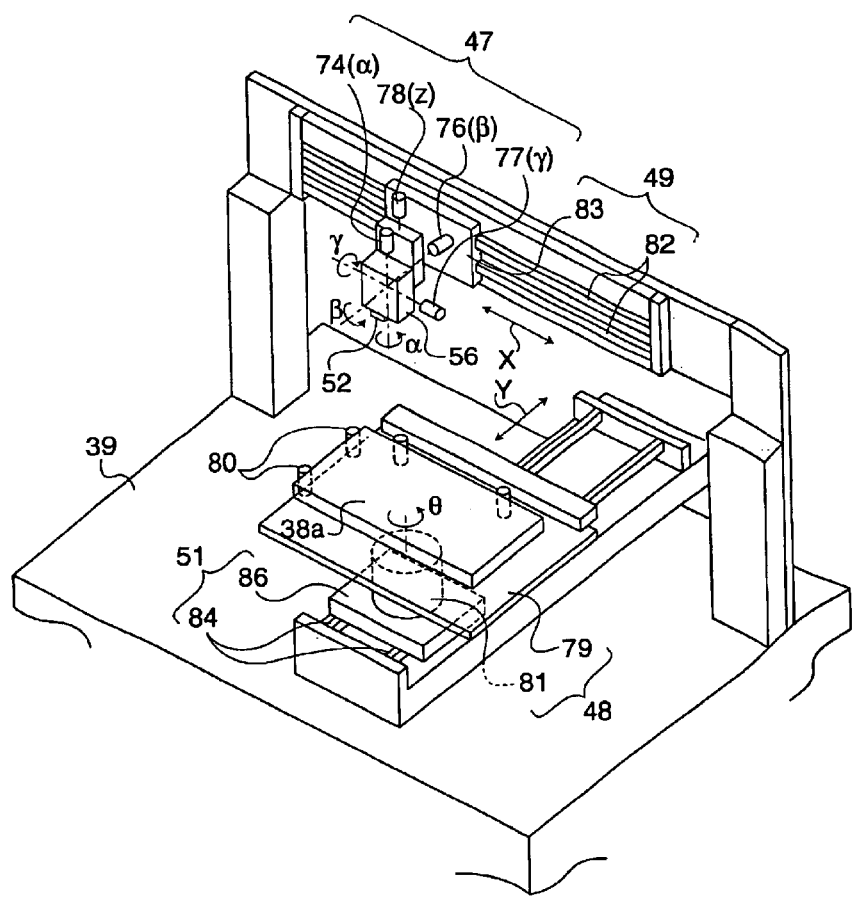
FIG. 13 is an enlarged perspective view of a major part of the inkjet device shown in FIG. 12.

With reference to FIG. 13, the head position controller 47 includes an αα motor 74 which rotates the inkjet head 52 around a vertical axis, a β motor 76 which rotates the inkjet head 52 around an axis parallel to the sub-scanning direction Y, a γ motor 77 which rotates the inkjet head 52 around an axis parallel to the main scanning direction X, and a Z motor 78 which moves the inkjet head 52 in the vertical direction.

In addition, with reference to FIG. 13, the base plate position controller 48 shown in FIG. 12 includes a table 79 on which the mother base plate 38a is disposed, and a θ motor 81 which rotates the table 79 in a horizontal plane, as shown by the arrow θ. In addition, as shown in FIG. 13, the main scanning driver 49 shown in FIG. 12 includes a guide rail 82 which extends in the main scanning direction X and a slider 83 which contains a linear motor that is driven based on pulses. The slider 83 moves in parallel in the main scanning direction X along the guide rail 82 when the linear motor contained in the slider 83 is operated.

In addition, as shown in FIG. 13, the sub-scanning driver 51 shown in FIG. 12 includes a guide rail 84 which extends in the sub-scanning direction Y and a slider 86 which contains a linear motor that is driven based on pulses. The slider 86 moves in paralell in the sub-scanning direction Y along the guide rail 84 when the linear motor contained in the slider 86 is operated.

Each of the linear motors contained in the sliders 83 and 86 can be operated with high precision by controlling a rotation angle of an output shaft based on pulse signals supplied to the motors. Accordingly, the position of the inkjet head 52 that is supported by the slider 83 can be controlled in the main scanning direction X with high precision, and the position of the table 79 can be controlled in the sub-scanning direction Y with high precision. In addition to the above-described method in which the pulse motors are used, the positions of the inkjet head 52 and the table 79 may also be feedback controlled using servo motors, or may be controlled by other methods.

The base plate supplying device 53 shown in FIG. 12 includes a base plate container 87 which contains the mother base plate 38a and a robot 88 which carries the mother base plate 38a. The robot 88 includes a base 89 which is disposed on an installing base such as the floor, ground, etc., an vertical shaft 91 which moves vertically relative to the base 89, a first arm 92 which rotates around the vertical shaft 91, a second arm 93 which rotates relative to the first arm 92, and a chucking member 94 which is disposed on the bottom surface of the second arm 93 at the end thereof. The chucking member 94 is able to chuck the mother base plate 38a by air suction, etc.

In FIG. 12, a capping device 106 and a cleaning device 107 are disposed at one side of the sub-scanning driver 51, and at positions inside the moving region of the inkjet head 52, which-is driven by the main scanning driver 49. In addition, an electrobalance 108 is disposed at the other side of the sub-scanning driver 51. The cleaning device 107 is used for cleaning the inkjet head 52. The electrobalance 108 is used for measuring the weight of an ink drop ejected from each nozzle 57 of the inkjet head 52. In addition, the capping device 106 is used for preventing the nozzles 57 from drying while the inkjet head 52 is in a standby state.

An inkjet head camera 111 is disposed near the inkjet head 52 in such a manner that the inkjet head camera 111 and the inkjet head 52 are able to move together. In addition, a base plate camera 112, which is supported by a supporting device (not shown) provided on the base 39, is disposed such that the base plate camera 112 is able to observe the mother base plate 38a.

Figure 17:
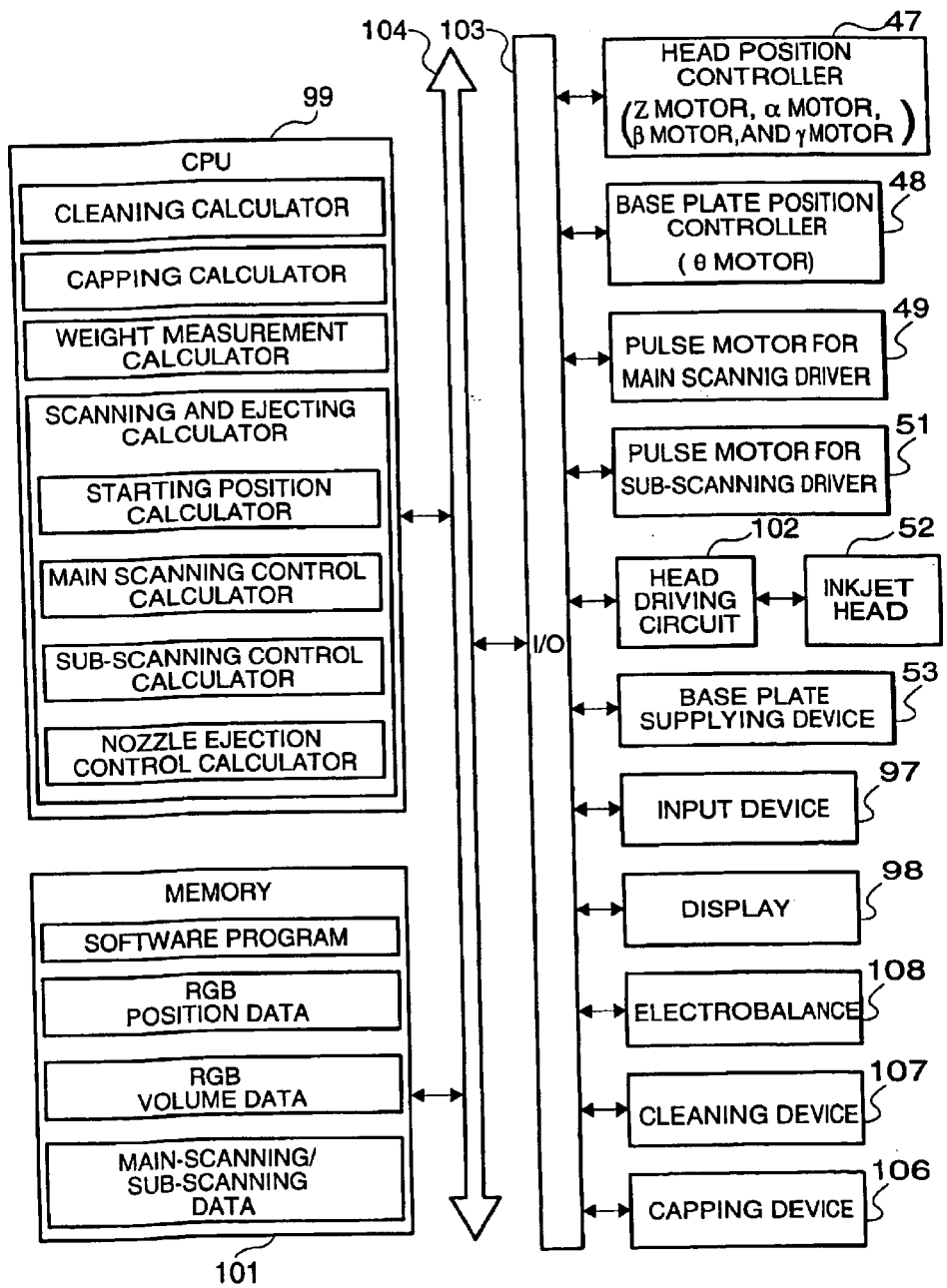
FIG. 17 is a block diagram showing an electrical control system used in the inkjet device shown in FIG. 12.

The control device 54 shown in FIG. 12 includes a main computer 96 containing a processor, a keyboard 97 which serves as an input device, and a Cathode Ray Tube (CRT) display 98. As shown in FIG. 17, the above-described processor includes a Central Processing Unit (CPU) which performs calculations and an information storage medium 101, that is, a memory that stores various information.

As shown in FIG. 17, the head position controller 47 shown in FIG. 12, the base plate position controller 48, the main scanning driver 49, and the sub-scanning driver 51 shown in FIG. 12, and an inkjet head driving circuit 102 for driving the piezoelectric elements 71 (see FIG. 16(b)) included in the inkjet head 52 are connected to the CPU 99 via an input/output interface 103 and a bus 104. In addition, the base plate supplying device 53, the input device 97, the display 98, the electrobalance 108, the cleaning device 107 and the capping device 106 are also connected to the CPU via the input/output interface 103 and the bus 104.

The memory 101 may be a semiconductor memory such as Random Access Memory (RAM), Read Only Memory (ROM), etc., or an external storage device such as a hard disk, a CD-ROM reader, a disk type storage medium, etc. The memory 101 can include a memory area for storing a software program in which operation processes of the inkjet device 46 are written, a memory area for storing the displacement of the slider 83 in the main scanning direction X and the displacement of the mother base plate 38a in the sub-scanning direction Y shown in FIG. 13, an area which serves as a work area for CPU 99, temporary files, etc., and various other memory areas.

In the present embodiment of the liquid crystal device manufacturing method, particularly of the color filter manufacturing method, the inkjet device 46 is used in both the subpixel forming process (P32) and the protecting film forming process (P33) shown in FIG. 11. The inkjet device 46 used in the subpixel forming process (P32) and the inkjet device 46 used in the protecting film forming process (P33) may have almost the same mechanism.

Figure 4:
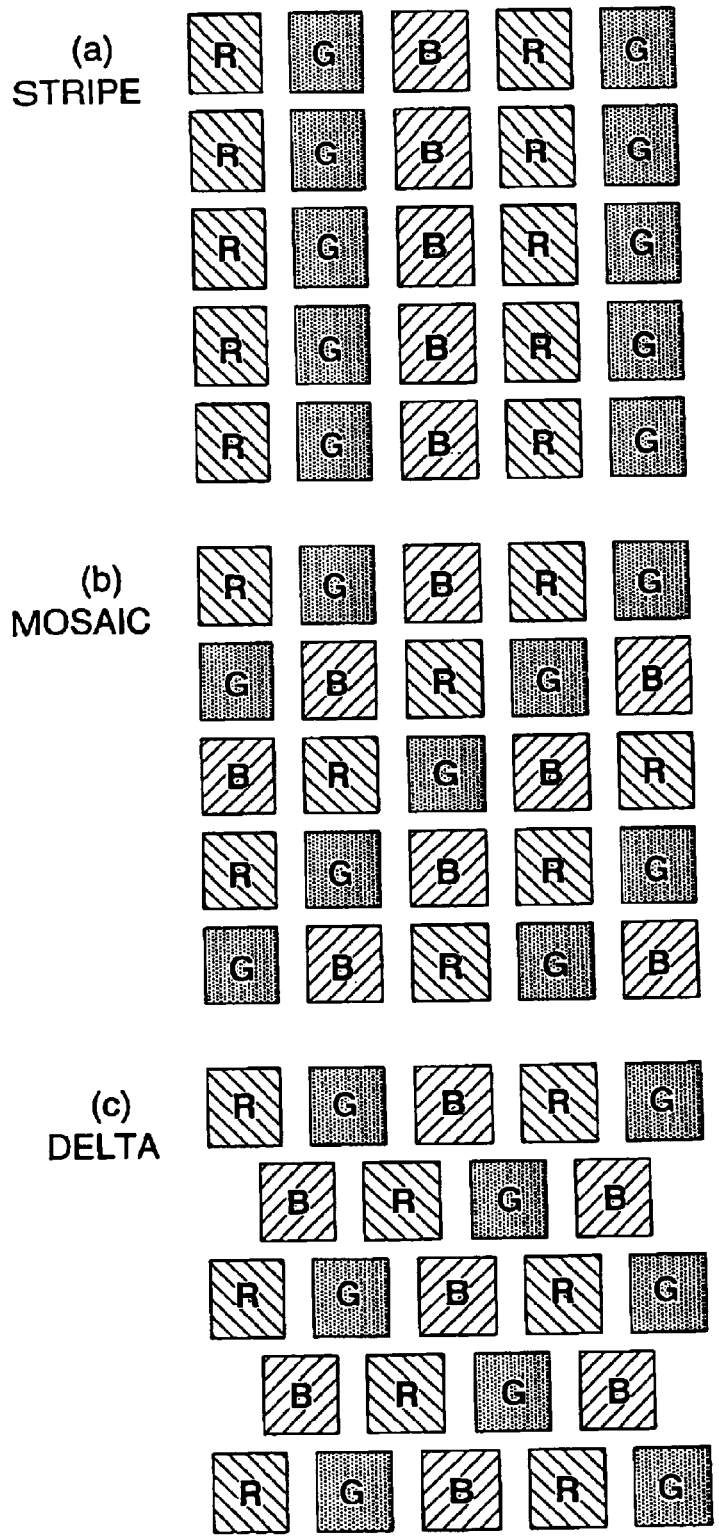
FIG. 4 is a schematic representation showing patterns in which subpixels are arranged in a color filter.

As shown in FIG. 17, the memory 101 contained in the inkjet device 46 used in the subpixel forming process (P32) stores a software program which controls the entire process of forming the subpixels, RGB position data, which is data of positions for forming the R, G, and B subpixels corresponding to one of the patterns shown in FIG. 4, and RGB volume data, which is data of the volumes of the R, G, and B subpixel materials to be supplied at the corresponding positions. In the RGB volume data, the volumes of the subpixel materials may be determined based on the colors, or based on coordinates on the mother base plate 38a.

While the inkjet head 52 is moved in the main scanning direction, the CPU 99 calculates when and from which nozzle 57 the ink, that is, the subpixel material, should be ejected based on the RGB position data and the RGB volume data.

Similarly to the inkjet device 46 used in the subpixel forming process (P32), the memory 101 shown in FIG. 17 contained in the inkjet device 46 used in the protecting film forming process (P33) stores a software program which controls the entire process of forming the protecting film, RGB position data, which is data of positions for forming the R, G, and B subpixels corresponding to one of the patterns shown in FIG. 4, and RGB volume data, which is data of the volumes of the R, G, and B subpixel materials to be supplied at the corresponding positions.

While the inkjet head 52 is moved in the main scanning direction, the CPU 99 calculates when and from which nozzle 57 the ink, that is, the protecting film material, should be ejected based on the RGB position data and the RGB volume data. The volume of the protecting film material ejected from each nozzle 57 may be determined such that the top surface of the protecting films 17 and the top surface of the bank 14 become even, as shown in FIG. 5(a). In such a case, the CPU 99 subtracts the volume of the subpixel 16 from the capacity of the cell formed by the bank 14, and determines the calculated difference as the volume of the protecting film material to be ejected.

Instead of storing the RGB volume data as described above, the memory 101 contained in the inkjet device 46 used in the protecting film forming process (P33) may directly store data of volumes of the protecting film material to be supplied in association with the colors of the subpixels.

The CPU 99 shown in FIG. 17 is used for ejecting the subpixel material or the protecting film material toward the mother base plate 38*a* at the predetermined positions based on the software program stored in the memory 101. The CPU 99 can include a cleaning calculator which performs calculations for a cleaning process, a capping calculator which performs calculations for a capping process, a weight measurement calculator which performs calculations for a weight measuring process using the electrobalance 108 (see FIG. 12), and a scanning and ejecting calculator which performs calculations for ejecting the subpixel material or the protecting film material at the predetermined positions by the inkjet method.

The scanning and ejecting calculator can be divided into a starting position calculator which performs calculations for setting the initial position at which the inkjet head 52 starts scanning, a main scanning control calculator which performs calculations for moving the inkjet head 52 in the main scanning direction X at a predetermined speed, a sub-scanning control calculator which performs calculations for moving the mother base plate 38*a* by a predetermined distance in the sub-scanning direction Y, and a nozzle ejection control calculator which performs calculations for controlling when and from which nozzle 57 the ink, that is, the subpixel material should be ejected.

Although the above-described functions are realized by the CPU 99 based on the software program in the present embodiment, a separate electronic circuit having such functions may also be used if possible.

The operation of the inkjet device 46, which is constructed as described above, will be described below with reference to a flowchart shown in FIG. 18.

When an operator turns on the power and the inkjet device 46 is activated, initial setting is performed at S1. More specifically, the head unit 56, the base plate supplying device 53, the control device 54, etc., are set to an initial state.

Then, when weight measurement is required (when the result is YES at S2), the head unit 56 shown in FIG. 13 is moved to the electrobalance 108 shown in FIG. 12 by the main scanning driver 49 (S3), and the volume of ink ejected from each nozzle 57 is measured by the electrobalance 108 (S4). Then, the voltage applied to the piezoelectric element 71 corresponding to each nozzle 57 is adjusted in accordance with the ink ejection characteristic of each nozzle 57 (S5).

Then, when cleaning is required (when the result is YES at S6), the head unit 56 is moved to the cleaning device 107 by the main scanning driver 49 (S7), and the cleaning device 107 cleans the inkjet head 52 (S8).

When it is determined that both weight measurement and cleaning are not to be performed (when results at S2 and S6 are both NO), or when the weight measurement and/or the cleaning ends, the mother base plate 38*a* is supplied to the table 79 by activating the base plate supplying device 53 shown in FIG. 12 at S9. More specifically, the mother base plate 38*a* inside the base plate container 87 is chucked by the chucking member 94, is transferred to the table 79 by operating the vertical shaft 91, the first arm 92, and the second arm 93, and is pushed against positioning pins 80 (see FIG. 13) disposed at suitable positions on the table 79. In order to prevent the displacement of the mother base plate 38*a* on the table 79, the mother base plate 38*a* is preferably fixed to the table 79 by air suction, etc.

Figure 19:
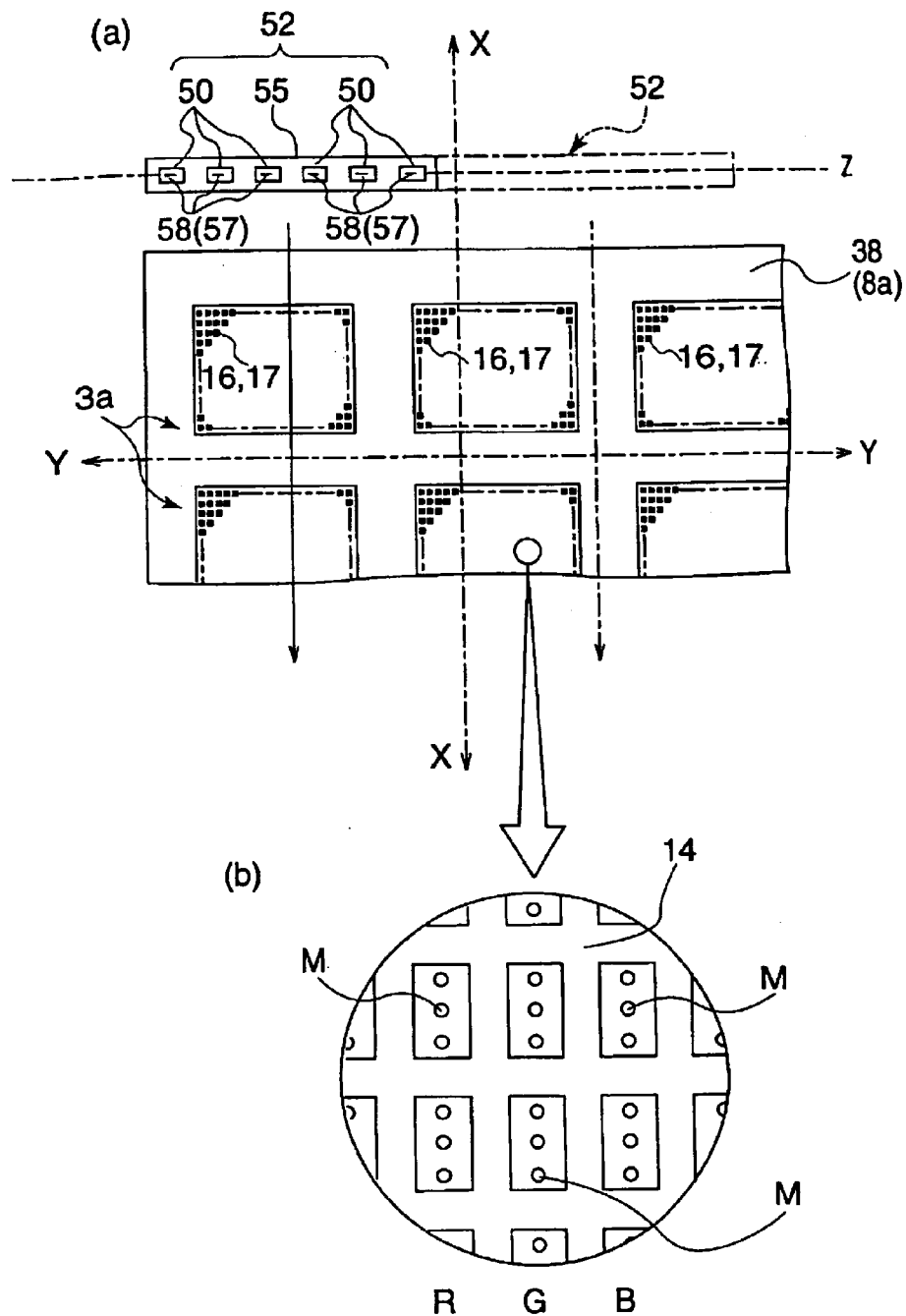
FIG. 19 is a schematic representation showing a process of forming a color filter, which is a main process of the liquid crystal device manufacturing method according to the embodiment.

Then, the output shaft of the θ motor 81 shown in FIG. 13 is rotated in small angular steps while the mother base plate 38*a* is observed by the substrate camera 112 shown in FIG. 12, so that the table 79 is rotated in the horizontal plane in small angular steps. Accordingly, the mother base plate 38*a* is positioned (S10). Then, while the mother base plate 38*a* is observed by the inkjet head camera 111, the position to start scanning is calculated (S11), and the main scanning driver 49 and the sub-scanning driver 51 are operated such that the inkjet head 52 is moved to the starting position (S12). As shown in FIG. 19, the inkjet head 52 is set such that the extending direction Z of the nozzle line 58 in each head chip 50 is perpendicular to the main scanning direction X.

Figure 18:
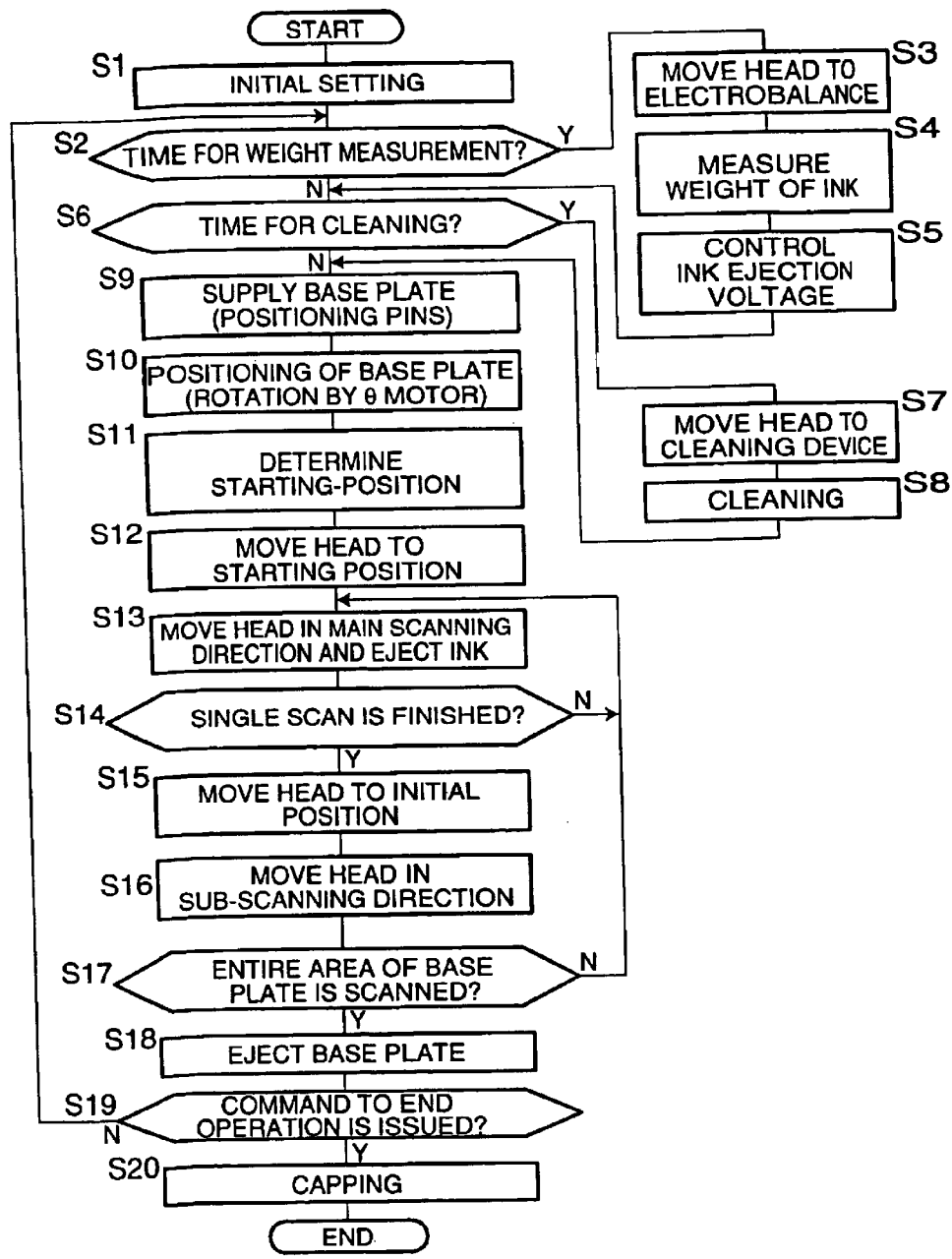
FIG. 18 is a flowchart showing a control process implemented by the control system shown in FIG. 17.

With reference to FIG. 18, after the inkjet head 52 reaches the starting position at S12, the inkjet head 52 starts to move in the main scanning direction X at S13, and the ejection of the ink starts at the same time. More specifically, the main scanning driver 49 shown in FIG. 13 drives the inkjet head 52 in the main scanning direction X shown in FIG. 19 at a constant speed. While the inkjet head 52 is moved, the nozzles 57 eject the subpixel material or the protecting film material when they reach the sections which are to receive the subpixel material or the protecting film material. FIG. 19(*b*) schematically shows the manner in which the subpixel material M or the protecting film material M is supplied to the sections formed by the bank 14 in the form of ink drops.

In FIG. 19(*a*), when the inkjet head 52 finishes a single scan in the main scanning direction over the mother base plate 38*a* (when the result is YES at S14), the inkjet head 52 returns to the initial position (S15). Then, the sub-scanning driver 51 drives the inkjet head 52 by a predetermined distance in the sub-scanning direction Y, for example, an integral multiple of the length of a single nozzle line 58 (S16). Then, the main scanning and the ejection of the ink are repeated, so that the subpixels 16 or the protecting films 17 are formed in the cells which are still empty (S13).

After the inkjet head 52 finishes a single main scan, the inkjet head 52 may be immediately moved in the sub-scanning direction Y without moving the inkjet head 52 back to the initial position, and then moved rearward in the main scanning direction X while the subpixel material or the protecting film material is ejected. In such a case, the main scanning for ejecting ink is performed not only when the inkjet head 52 is moved forward in the main scanning direction X but also when the inkjet head is moved rearward in the main scanning direction X.

When the inkjet head 52 finishes forming the subpixels 16 or the protecting films 17 over the entire area of the mother base plate 38*a* (when the result is YES at S17), the mother base plate 38*a* is transferred out by the base plate supplying device 53 or by other transferring devices at S18. Then, unless a command to end the operation is issued by the operator (unless the result at S19 is YES), the process returns to S2 and the operation of ejecting the subpixel material or the protecting film material toward another mother base plate 38*a* starts.

When the command to end the operation is issued by the operator (when the result at S19 is YES), the CPU 99 controls the inkjet head 52 such that the inkjet head 52 is transferred to the capping device 106 shown in FIG. 12. Then, the inkjet head 52 is subjected to the capping process by the capping device 106 (S20). Accordingly, the operation of patterning the subpixels 16 or the protecting films 17 in the color filter 11 is completed. Then, the above-described process of forming the first electrodes 12a (P3 in FIG. 9) is performed.

As described above, according to the liquid crystal device manufacturing method of the present embodiment, each of the subpixels 16 shown in FIG. 11 is formed by the inkjet method. Thus, the relationships between the openings 18 formed in the light reflecting film 9 and the subpixels 16 can be individually adjusted, so that the colors displayed by the subpixels 16 can be individually and precisely adjusted. Accordingly, uniform color display over the display area can be realized.

Figure 15:
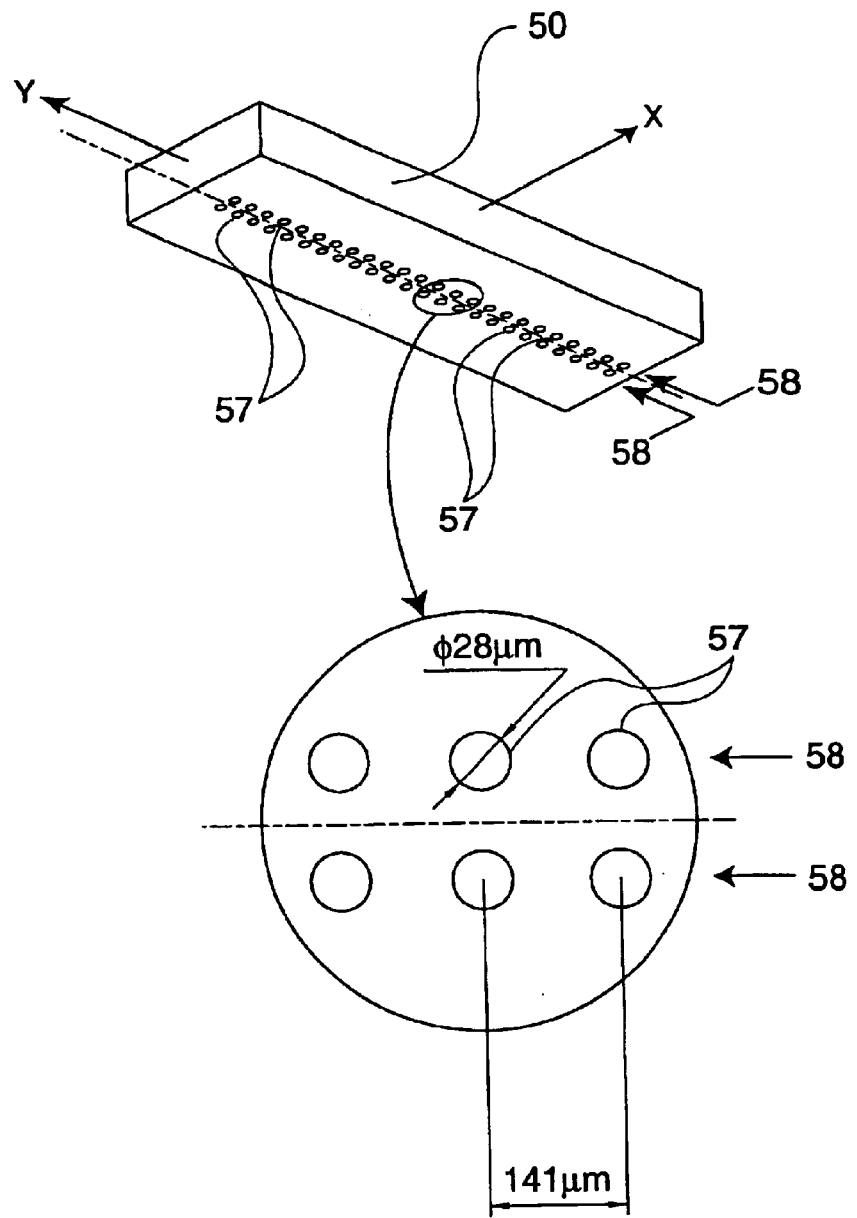
FIG. 15 is a perspective view showing a modification of the head chip included in the inkjet head.

FIG. 15 shows a modification of the head chips 50 shown in FIG. 14(b). With reference to FIG. 14(b), each of the head chips 50 can be provided with a single nozzle line 58 in the main scan direction X. However, the head chip 50 may also be provided with a plurality of nozzle lines 58 which are arranged in the main scanning direction X (in FIG. 15, two nozzle lines 58 are formed). By using this head chip 50, since the ink can be ejected from two lines of nozzles 57 arranged in the main scanning direction X, ejection of the subpixel material or the protecting film material can be controlled in various ways while the carriage 55 (see FIG. 14(a)) is moved in the main scanning direction X.

Figure 20:
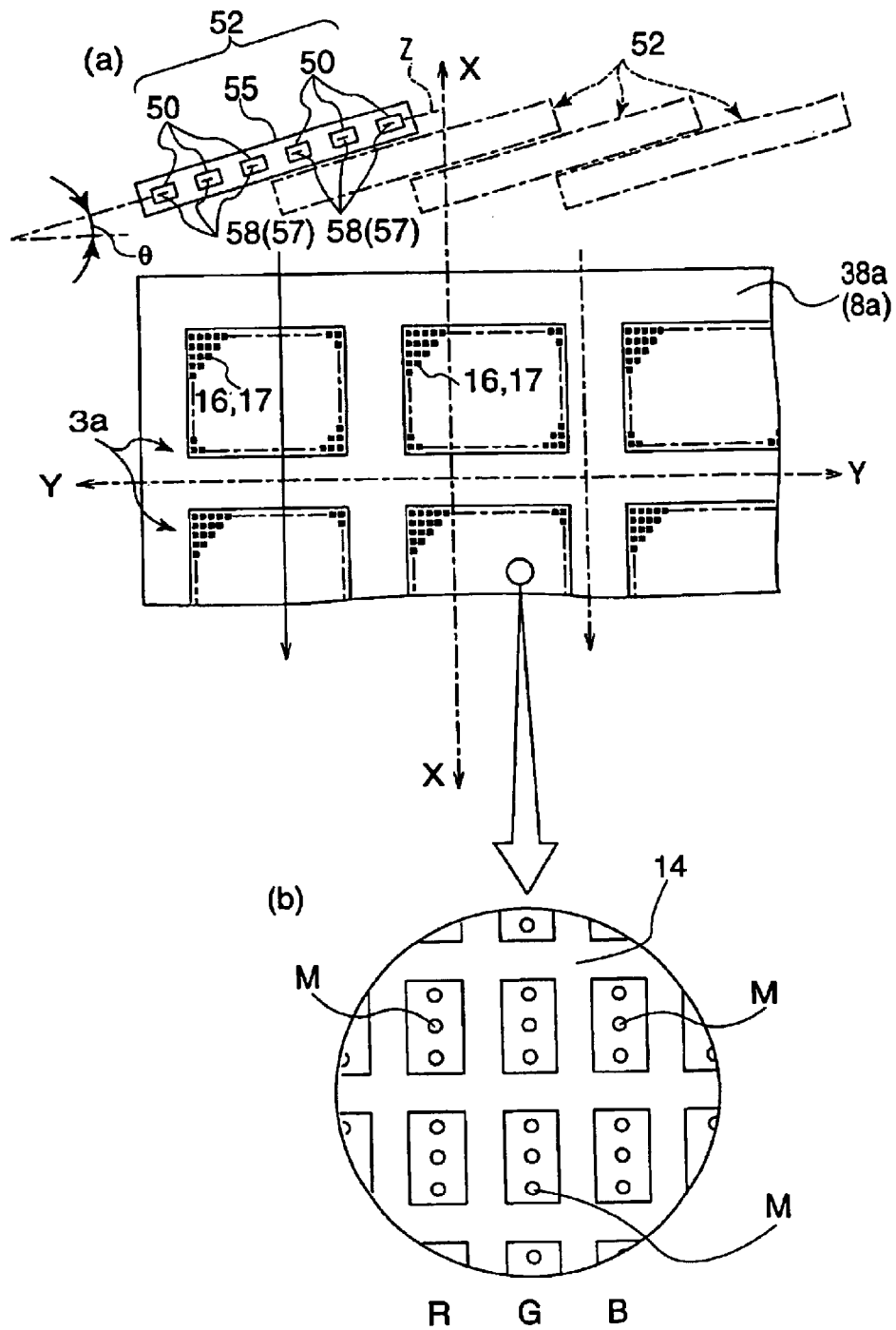
FIG. 20 is a schematic representation showing a process of forming a color filter, which is a main process of a liquid crystal device manufacturing method according to another embodiment.

FIG. 20 shows a main process, especially a color filter forming process, of a liquid crystal device manufacturing method according to another embodiment. This process is performed in place of the process shown in FIG. 19 which is described in the above-described embodiment. The color filter manufactured by the manufacturing method of the present embodiment is the same as the color filter denoted by reference numeral 11 in FIG. 5. In addition, a plurality of color filters 11 can be formed on the mother base plate 38a shown in FIG. 10(a) at the same time.

In addition, the pattern of the subpixels 16 formed in the color filter 11 may be one of the patterns shown in FIG. 4 (the striped pattern, etc.), and the color filter 11 may be formed by the processes shown in FIG. 11 (P31 to P33). In addition, the inkjet device used in the subpixel forming process (P32) and the inkjet device used in the protecting film forming process (P33) may be constructed as shown in FIG. 12.

As is apparent from FIGS. 19 and 20, the present embodiment is different from the above-described embodiment in that, when the inkjet head 52 is disposed at the initial position, that is, at the main scan starting position, above the mother base plate 38a, the entire body of the carriage 55 is inclined relative to the sub-scanning direction Y by an angle θ. Thus, the extending direction Z of six nozzle lines 58 is also inclined relative to the sub-scanning direction Y by the angle θ.

According to the present embodiment, the head chips 50 are moved in the main scanning direction X while they are inclined relative to the sub-scanning direction Y by the angle θ. Thus, the pitch between the nozzles 57 formed in each head chip 50 can be made the same as the pitch between the sections in which the subpixels 16 and the protecting films 17 are formed, that is, the pitch between the elements. When the pitch between the nozzles 57 and the pitch between the elements are made the same as described above, it is not necessary to adjust the position of the nozzle lines 58 in the sub-scanning direction Y.

Figure 21:
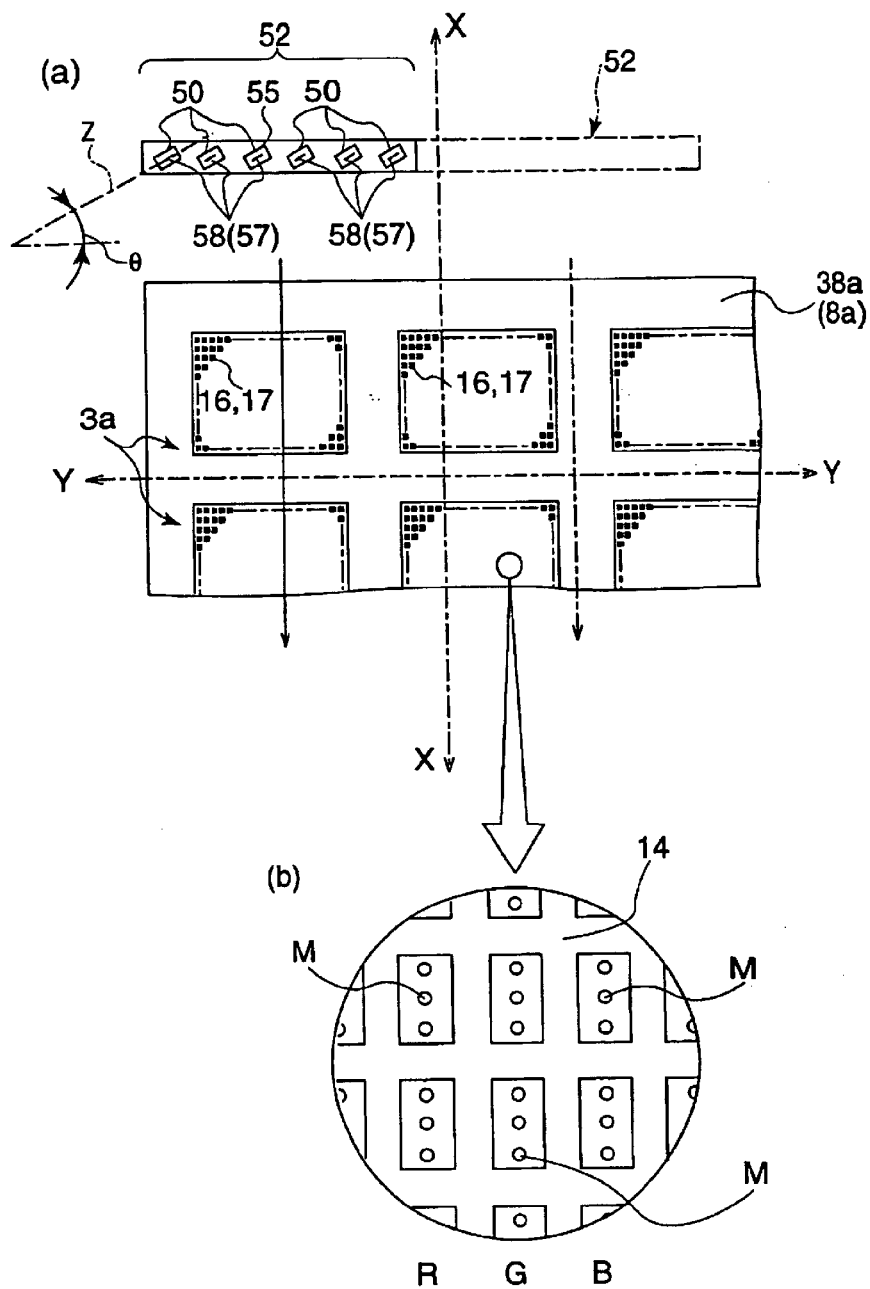
FIG. 21 is a schematic representation showing a process of forming a color filter, which is a main process of a liquid crystal device manufacturing method according to another embodiment.

FIG. 21 shows a main process, especially an another color filter forming process, of a liquid crystal device manufacturing method according to another embodiment. This process is also performed in place of the process shown in FIG. 19 which is described in the above-described embodiment. The color filter substrate manufactured by the manufacturing method of the present embodiment is the same as the color filter for liquid crystal denoted by reference numeral 11 in FIG. 5. In addition, a plurality of color filters 11 can be formed on the mother base plate 38a shown in FIG. 10(a) at the same time.

In addition, the pattern of the subpixels 16 formed in the color filter 11 may be one of the patterns shown in FIG. 4 (the striped pattern, etc.), and the color filter 11 may be formed by the processes shown in FIG. 11 (P31 to P33). In addition, the inkjet device used in the subpixel forming process (P32) and the inkjet device used in the protecting film forming process (P33) may be constructed as shown in FIG. 12.

As is apparent from FIGS. 19 and 21, the present embodiment is different from the above-described embodiment in that, when the inkjet head 52 is disposed at the initial position, that is, at the main scan starting position, above the mother base plate 38a, six head chips 50 are inclined relative to the sub-scanning direction Y by an angle θ although the entire body of the carriage 55 is not inclined. Thus, the extending direction Z of each nozzle line 58 is also inclined relative to the sub-scanning direction Y by the angle θ.

According to the present embodiment, the head chips 50 are moved in the main scanning direction X while they are inclined relative to the sub-scanning direction Y by the angle θ. Thus, the pitch between the nozzles 57 in each nozzle line 58 can be made the same as the pitch between the sections in which the subpixels 16 and the protecting films 17 are formed, that is, the pitch between the elements. When the pitch between the nozzles 57 and the pitch between the elements are made the same as described above, it is not necessary to adjust the position of the nozzle lines 58 in the sub-scanning direction Y.

In addition, according to the present embodiment, the entire body of the carriage 55 is not inclined as shown in FIG. 20, rather, only the head chips 50 are inclined. Thus, the distance between the nozzle 57 that is closest to the mother base plate 38a to be ejected and the nozzle 57 that is farthest from the mother base plate 38a can be significantly reduced relative to the case shown in FIG. 20. Thus, the time interval during which the inkjet head 52 is moved in the main scanning direction X can be reduced, and the manufacturing time of the color filter can be reduced.

In the embodiment shown in FIGS. 5, 6, 7, and 8, the subpixels 16 are formed in the section defined by the bank 14 in a convex shape such that the central parts thereof swell upward, in other words, shaped like a dome. This shape can be formed when the subpixel material supplied by the inkjet method is dried slowly and at low temperature, for example, at 40° C. for about 10 minutes.

Figure 22:
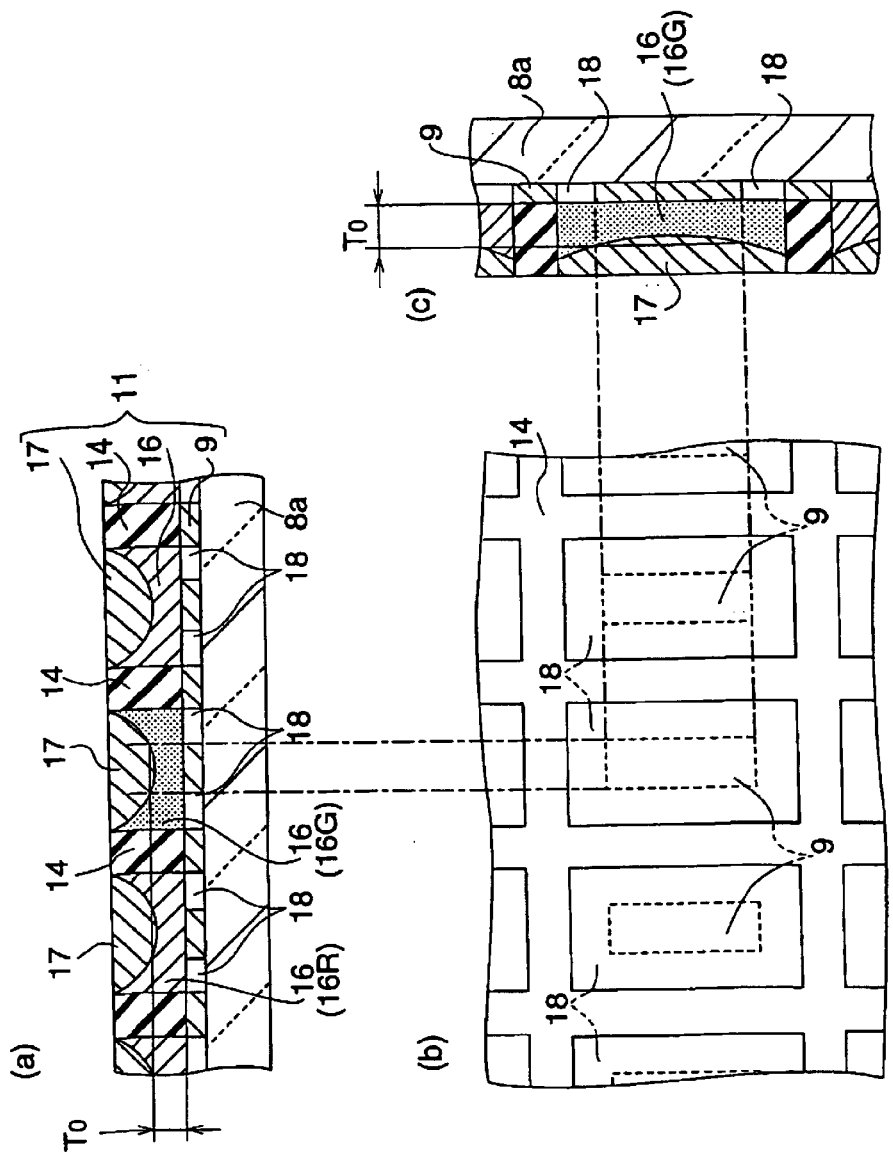
FIG. 22 is a schematic representation showing another example of a construction of a single pixel in a color filter, where (a) is a sectional view of subpixels taken along the lateral direction thereof, (b) is a plan view of the subpixels, and (c) is a sectional view of one of the subpixels taken along the longitudinal direction thereof.

As shown in FIG. 22, instead of forming the subpixels 16 in the above-described shape, it should be understood that the subpixels 16 may also be formed in a concave shape such that the central parts thereof are hollow. This shape can be formed when the subpixel material supplied by the inkjet method is dried quickly and at high temperature, for example, at 100° C. for about 1 minutes. In the drying process at such a high temperature, the tolerance range of the temperature is large compared with a drying process at a low temperature, so that the temperature can be easily controlled, and the time necessary for the drying process can be reduced.

As shown in FIG. 22, in the case in which the subpixels 16 are formed in the concave shape, the openings 18 of the light reflecting film 9 are formed at the peripheral regions of the sections formed by the bank 14. That is, the openings 18 are formed in an annular shape at regions corresponding to the thick parts of the subpixels 16. Accordingly, the length of the optical path in the subpixels 16 in the reflective display mode and that in the transmissive display mode can be made close or approximately the same, so that the color display can be made uniform between the reflective display mode and the transmissive display mode.

Also in the present embodiment, the corners of the openings 18 may be formed as beveled corners Ml shown in FIG. 6(b) or as rounded corners M2 shown in FIG. 7(b). In addition, the openings 18 may also be formed in the light reflecting film 9 along one of the interference fringes F, which correspond to the thickness distribution of the subpixels 16, as shown in FIG. 8(b).

In FIG. 22, the components similar to those shown in FIG. 5 are denoted by the same reference numerals and the explanations thereof are omitted.

Figure 23:
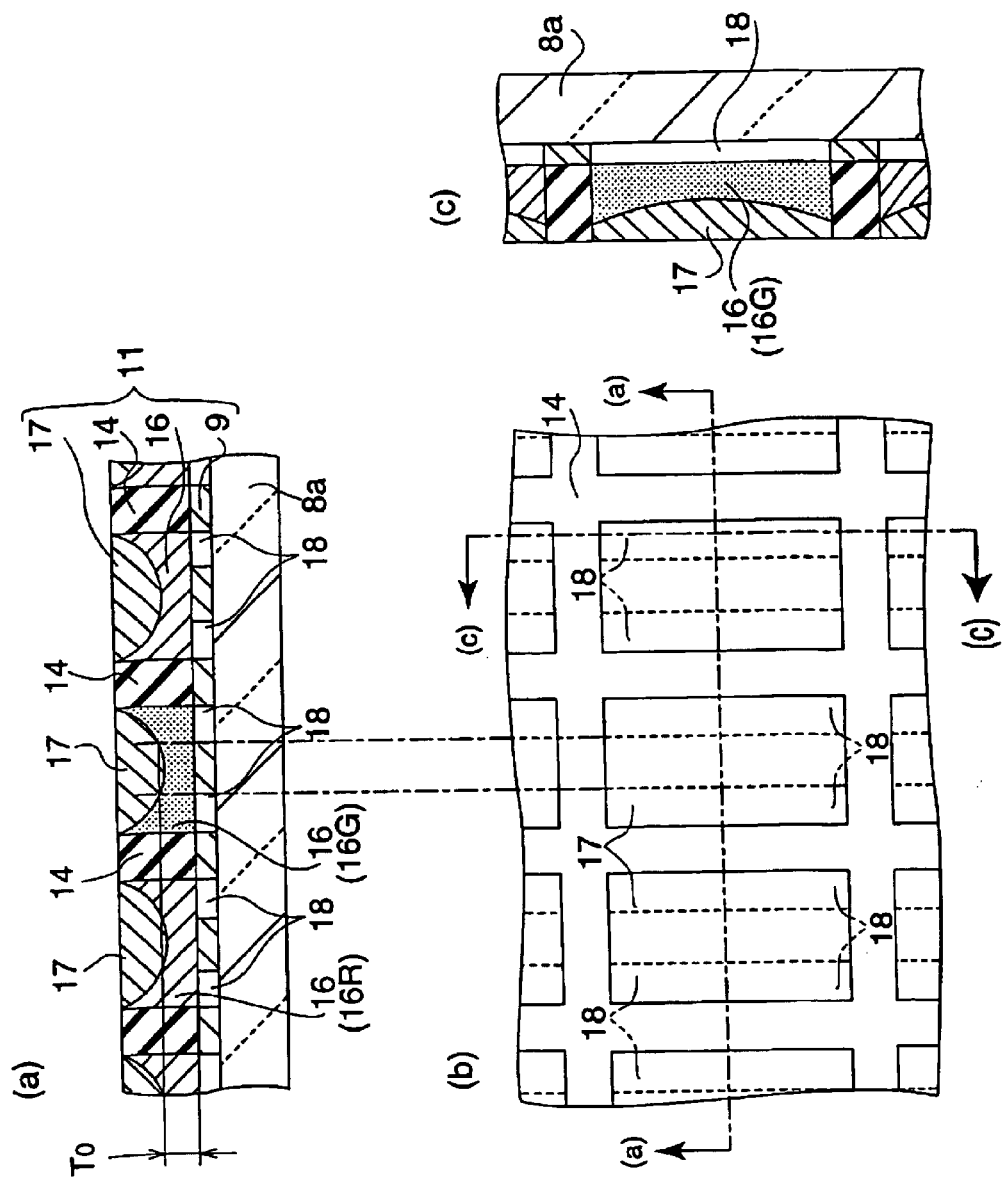
FIG. 23 is a schematic representation showing another example of a construction of a single pixel in a color filter, where (a) is a sectional view of subpixels taken along the lateral direction thereof, (b) is a plan view of the subpixels, and (c) is a sectional view of one of the subpixels taken along the longitudinal direction thereof.

FIG. 23 shows a modification of the openings 18 in the light reflecting film 9. Openings 18 shown in FIG. 23 differ from those shown in FIG. 22 in that the openings 18 are formed along the longitudinal direction of the rectangular sections formed by the bank 14 (that is, the vertical direction in FIG. 23(b)), in the peripheral region thereof. Except for this, the present modification is the same as the embodiment shown in FIG. 22.

Figure 24:
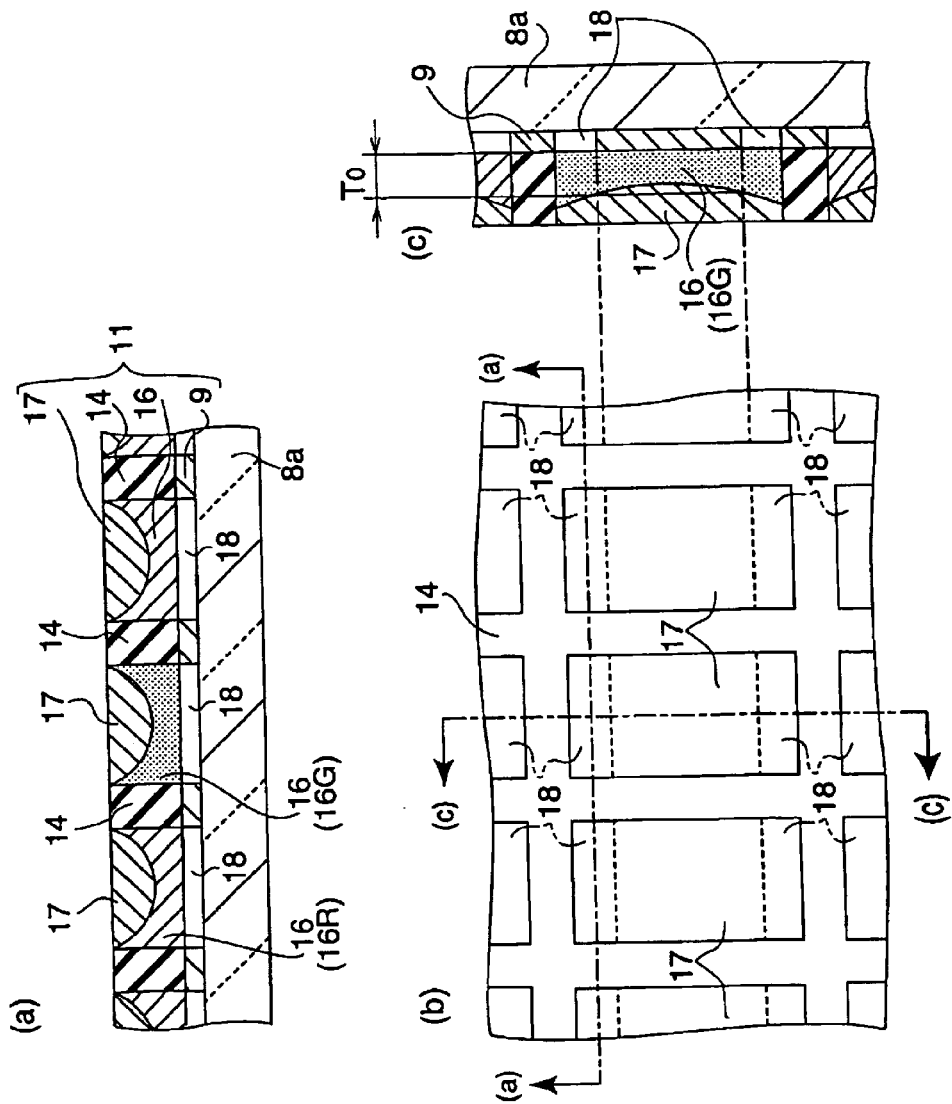
FIG. 24 is a schematic representation showing another example of a construction of a single pixel in a color filter, where (a) is a sectional view of subpixels taken along the lateral direction thereof, (b) is a plan view of the subpixels, and (c) is a sectional view of one of the subpixels taken along the longitudinal direction thereof.

FIG. 24 shows another modification of the openings 18 in the light reflecting film 9. Openings 18 shown in FIG. 24 differ from those shown in FIG. 22 in that the openings 18 are formed along the lateral direction of the rectangular sections formed by the bank 14 (that is, the horizontal direction in FIG. 24(b)), in the peripheral region thereof. Except for the differing openings, the present modification is the same as the embodiment shown in FIG. 22.

Figure 25:
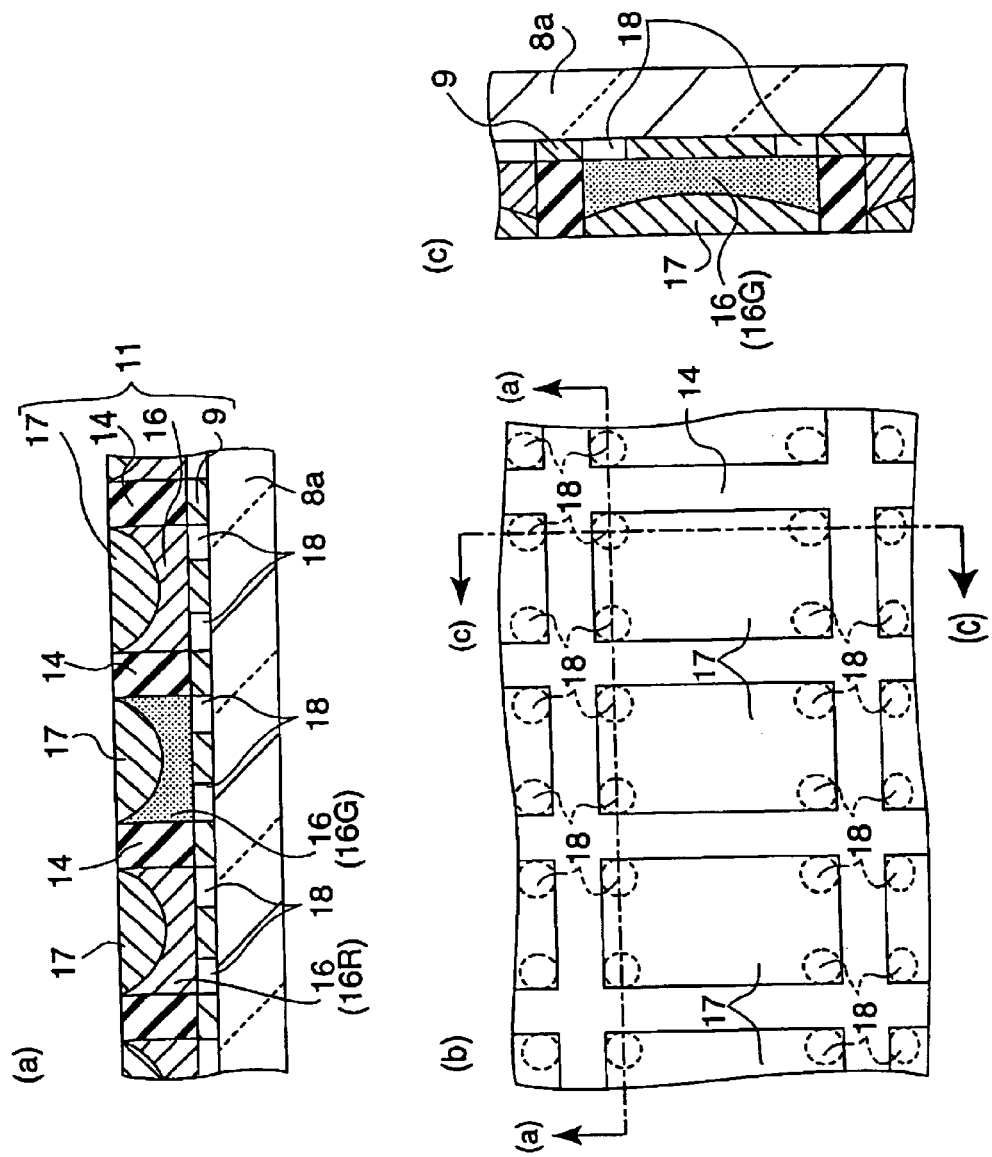
FIG. 25 is a schematic representation showing another example of a construction of a single pixel in a color filter, where (a) is a sectional view of subpixels taken along the lateral direction thereof, (b) is a plan view of the subpixels, and (c) is a sectional view of one of the subpixels taken along the longitudinal direction thereof.

FIG. 25 shows another modification of the openings 18 in the light reflecting film 9. Openings 18 shown in FIG. 25 differ from those shown in FIG. 22 in that the openings 18 are formed at four corners of the rectangular sections formed by the bank 14 in a columnar shape, that is, a circular shape in cross section. Except for the differing openings, the present modification is the same as the embodiment shown in FIG. 22.

Figure 26:
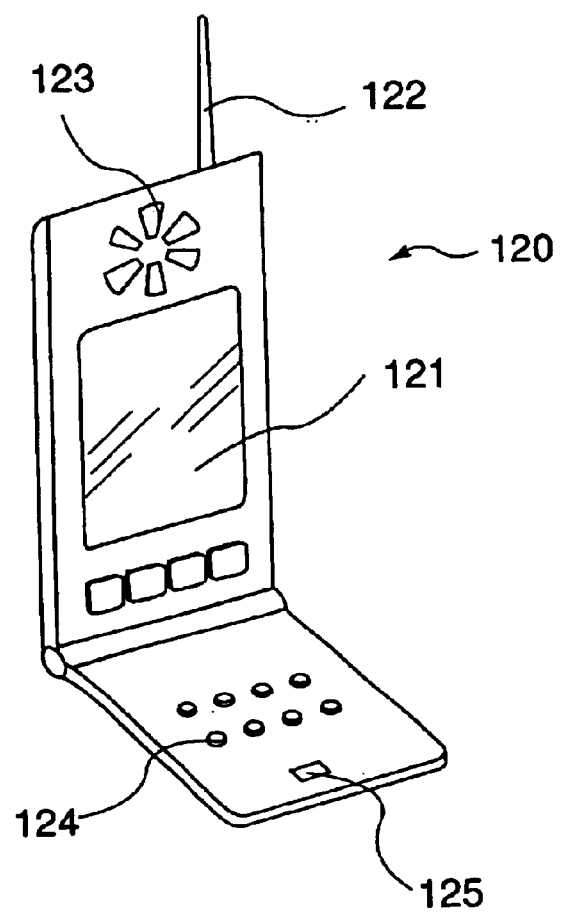
FIG. 26 is a perspective view showing an embodiment of an electronic device according to the present invention.

FIG. 26 shows a mobile phone according to an embodiment of an electronic device of the present invention. In FIG. 26, a mobile phone 120 includes a display 121 which is constructed of a liquid crystal device, an antenna 122, a speaker 123, a key switch group 124, and a microphone 125. The liquid crystal device 121, which functions as a display, is constructed of, for example, the liquid crystal device 1 shown in FIG. 1.

Figure 27:
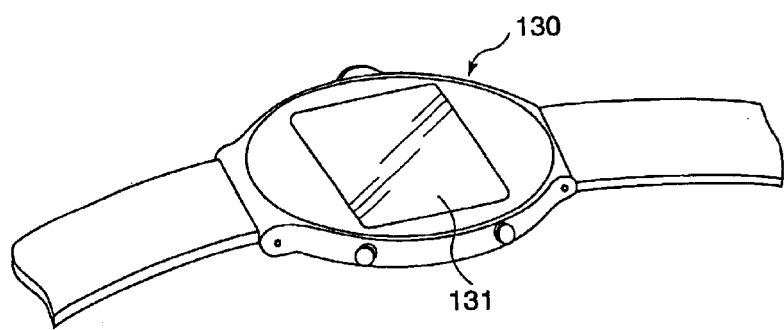
FIG. 27 is a perspective view showing another embodiment of an electronic device according to the present invention.

FIG. 27 shows a watch according to another embodiment of an electronic device of the present invention. In FIG. 27, a watch 130 includes a liquid crystal device 131 which serves as a display. The liquid crystal device 131 is constructed of, for example, the liquid crystal device 1 shown in FIG. 1.

Figure 28:
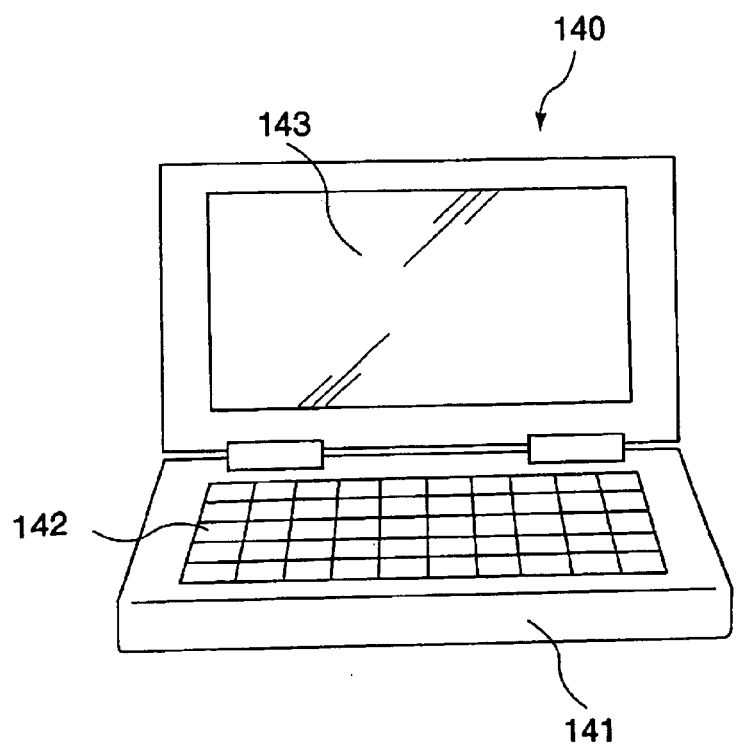
FIG. 28 is a front view showing another embodiment of an electronic device according to the present invention.

FIG. 28 shows a portable information processor according to another embodiment of an electronic device of the present invention. In FIG. 28, a portable information processor 140 functions as, for example, a word processor, a personal computer, etc., and includes a main body 141, an input device 142 such as keyboard, etc. disposed on the exterior of the main body 141, and a liquid crystal device 143 which functions as a display. A processor contained inside the main body performs calculations based on the information input via the keyboard 142, and the results are displayed on the liquid crystal device 143.

Although the preferred embodiments of the present invention have been described, it should be understood that the present invention is not limited to the above-described embodiments, and various modifications can be made within the scope of the present invention which is disclosed in the claims.

For example, although the R, G, and B subpixels are used in the foregoing descriptions, C(cyan), M(magenta), and Y(yellow) subpixels may also be used. In such a case, materials for forming the subpixels of C, M, and Y may be used instead of the materials for forming the R, G, and B subpixels.

In addition, although six head chips 50 are disposed in a single inkjet head 52 in the above-described embodiments, as shown in FIG. 14, the number of head chips 50 may be increased or reduced.

In addition, in the embodiment shown in FIGS. 10(a) and 10(b), a plurality of lines of first substrates 3a are formed in the first mother base plate 38a, and a plurality of lines of second substrates 3b are formed in the second mother base plate 38b. However, the present invention may also be applied in the case in which a single line of first substrates 3a is formed in the first mother base plate 38a and a single line of second substrates 3b is formed in the second mother base plate 38b. In addition, the present invention may also be applied in the case in which a single first substrate 3a having the same or smaller size relative to the first mother base plate 38a is formed on the first mother base plate 38a, and a single second substrate 3b having the same or smaller size relative to the second mother base plate 38b is formed on the second mother base plate 38b.

In addition, in the inkjet device 46 shown in FIGS. 12 and 13, the inkjet head 52 is moved in the X direction for main scanning over the base plate 38a. In addition, the mother base plate 38a is moved in the Y direction by the sub-scanning driver 51 for the sub-scanning of the inkjet head 52 over the mother base plate 38a. However, the mother base plate 38a may be moved in the Y direction for the main scanning and the inkjet head 52 may be moved in the X direction for the sub-scanning.

In addition, although the inkjet head in which ink is ejected by deforming piezoelectric elements are used in the above-described embodiments, an inkjet head having other constructions may also be used.

In addition, the protecting films 17 may be formed using methods other than the inkjet method, for example, spin coating, roll coating, printing, etc.

As described above, according to the present invention, the openings are formed in the light reflecting film at regions corresponding to the thickest parts of the subpixels. In addition, the openings are formed in the light reflecting film at regions corresponding to the central regions of the subpixels. In addition, the openings are formed in the light reflecting film in such a manner that the openings extend in the longitudinal direction of the subpixels. Accordingly, color display which is uniform over the display area, and which is uniform between the reflective display mode and the transmissive display mode can be obtained.

While this invention has been described in conjunction with the specific embodiments thereof, it is evident that many alternatives, modifications and variations will be apparent to those skilled in the art. Accordingly, preferred embodiments of the invention as set forth herein are intended to be illustrative not limiting. There are changes that may be made without departing from the spirit and scope of the invention.

What is claimed is:

1. A liquid crystal device, comprising:
  a pair of substrates which sandwich liquid crystal therebetween;
  a light reflecting film formed on at least one of the substrates; and a color filter formed on the light reflecting film, wherein the color filter includes a partitioning member that divides a surface of the substrate into a plurality of sections and subpixels that are individually formed in the sections, and wherein openings are formed in the light reflecting film at regions corresponding to thickest parts of the subpixels.

2. A liquid crystal device according to claim 1, wherein the openings have a shape such that corners thereof are cut off.

3. A liquid crystal device according to claim 1, wherein the planner shape of the opening is at least one of a rectangular shape, an oval shape, and an elliptical shape.

4. A liquid crystal device according to claim 1, wherein an area of a single opening is 5% to 30% of an area of a single section.

5. A liquid crystal device according to claim 1, wherein the subpixels are formed in a convex shape such that central portions thereof swell upward.

6. An electronic device, comprising:

a liquid crystal device according to claim 1; and a housing which contains the liquid crystal device.

7. A liquid crystal device, comprising:

a pair of substrates which sandwich liquid crystal therebetween;

a light reflecting film formed on at least one of the substrates; and a color filter formed on the light reflecting film, wherein the color filter includes a partitioning member that divides the surface of the substrate into a plurality of sections and subpixels that are individually formed in the sections, and wherein openings are formed in the light reflecting film at regions corresponding to central parts of the sections.

8. A liquid crystal device, comprising:

a pair of substrates which sandwich liquid crystal therebetween;

a light reflecting film formed on at least one of the substrates; and a color filter formed on the light reflecting film, wherein the color filter includes a partitioning member that divides a surface of the substrate into a plurality of rectangular sections and subpixels that are individually formed in the rectangular sections, and wherein openings are formed in the light reflecting film in such a manner that the openings extend in a longitudinal direction of the rectangular sections.

9. A liquid crystal device, comprising:

a pair of substrates which sandwich liquid crystal therebetween;

a light reflecting film formed on at least one of the substrates; and a color filter formed on the light reflecting film, wherein the color filter includes a partitioning member that divides a surface of the substrate into a plurality of sections and subpixels that are individually formed in the sections, and wherein openings are formed in the light reflecting film in such a manner that the openings have a shape corresponding to a thickness distribution of the subpixels.

10. A liquid crystal device, comprising:

a pair of substrates which sandwich liquid crystal therebetween;

a light reflecting film formed on at least one of the substrates; and a color filter formed on the light reflecting film, wherein the color filter includes a partitioning member that divides the surface of the substrate into a plurality of sections, and subpixels that are individually formed in the sections, wherein the subpixels are formed in a concave shape such that central portions thereof are hollow, and wherein openings are formed in the light reflecting film at regions corresponding to thickest parts of the subpixels.

11. A liquid crystal device, comprising:

a pair of substrates which sandwich liquid crystal therebetween;

a light reflecting film formed on at least one of the substrates; and a color filter formed on the light reflecting film, wherein the color filter includes a partitioning member that divides a surface of the substrate into a plurality of sections and subpixels that are individually formed in the sections, wherein the subpixels are formed in a concave shape such that central portions thereof are hollow, and wherein openings are formed in the light reflecting film at regions corresponding to peripheral parts of the sections in such a manner that peripheral portions of the sections are partly or entirely covered by the openings.

12. A liquid crystal device, comprising:

a pair of substrates which sandwich liquid crystal therebetween;

a light reflecting film formed on at least one of the substrates; and a color filter formed on the light reflecting film, wherein the color filter includes a partitioning member that divides the surface of the substrate into a plurality of rectangular sections and subpixels that are individually formed in the rectangular sections, wherein the subpixels are formed in a concave shape such that central portions thereof are hollow, and wherein openings are formed in the light reflecting film in such a manner that the openings extend in a longitudinal direction or a lateral direction of the rectangular sections at regions corresponding to peripheral parts of the rectangular sections.

13. A liquid crystal device, comprising:

a pair of substrates which sandwich liquid crystal therebetween;

a light reflecting film formed on at least one of the substrates; and a color filter formed on the light reflecting film, wherein the color filter includes a partitioning member that divides a surface of the substrate into a plurality of sections and subpixels that are individually formed in the sections, wherein the subpixels are formed in a concave shape such that central portions thereof are hollow, and wherein openings are formed in the light reflecting film in such a manner that the openings have a shape corresponding to a thickness distribution of the subpixels.

* * * * *